(12) United States Patent
Pan et al.

(10) Patent No.: US 12,739,937 B2
(45) Date of Patent: Sep. 15, 2026

(54) EXTENDED DISONTINUOUS RECEPTION PARAMETER CONFIGURATION METHOD AND APPARATUS

(71) Applicant: HUAWEI TECHNOLOGIES CO., LTD., Shenzhen (CN)

(72) Inventors: Qi Pan, Beijing (CN); Zhenglei Huang, Shenzhen (CN); Lei Chen, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 308 days.

(21) Appl. No.: 18/475,437

(22) Filed: Sep. 27, 2023

(65) Prior Publication Data

US 2024/0023196 A1 Jan. 18, 2024

Related U.S. Application Data

(63) Continuation of application No. PCT/CN2022/084768, filed on Apr. 1, 2022.

(30) Foreign Application Priority Data

Apr. 2, 2021 (CN) ......................... 202110363739.9

(51) Int. Cl.
*H04W 76/00* (2018.01)
*H04W 68/00* (2009.01)
*H04W 76/28* (2018.01)

(52) U.S. Cl.
CPC ........... *H04W 76/28* (2018.02); *H04W 68/00* (2013.01)

(58) Field of Classification Search
None
See application file for complete search history.

(56) References Cited

U.S. PATENT DOCUMENTS

| | | | | |
|---|---|---|---|---|
| 10,575,278 | B2 * | 2/2020 | Kim | H04W 68/02 |
| 2018/0263012 | A1 * | 9/2018 | Ryu | H04W 68/02 |
| 2019/0014603 | A1 * | 1/2019 | Karakkad Kesavan Namboodiri | H04W 76/28 |

FOREIGN PATENT DOCUMENTS

| | | | | | |
|---|---|---|---|---|---|
| CN | 109155949 | A | | 1/2019 | |
| CN | 116569612 | A | * | 8/2023 | H04W 68/02 |
| EP | 4278714 | B1 | * | 1/2026 | H04W 76/27 |

OTHER PUBLICATIONS

Zte Corporation et al: "Introduction of eDRX for redcap", 3GPP Draft; R2-2006905, 3rd Generation Partnership Project (3GPP), Mobile Competence Centre; 650, Route Des Lucioles; F-06921 Sophia-Antipolis Cedex; France vol. RAN WG2, No. electronic; Aug. 17, 2020-Aug. 28, 2020 Aug. 7, 2020 (Aug. 7, 2020), XP051911780, total 7 pages.

(Continued)

*Primary Examiner* — Gerald A Smarth
(74) *Attorney, Agent, or Firm* — HAUPTMAN HAM, LLP

(57) ABSTRACT

A communication method includes receiving indication information from a session management function (SMF) network element. The indication information indicates that downlink data of a first terminal device arrives at a core network side. The communication method also includes, in response to an extended discontinuous reception (eDRX) cycle of the first terminal device being greater than or equal to a first threshold, sending an eDRX parameter to a first access network device based on capability information of the first terminal device and capability information of the first access network device. The first access network device is any access network device in a tracking area (TA) list of the first terminal device.

20 Claims, 8 Drawing Sheets

(56) References Cited

OTHER PUBLICATIONS

Extended European Search Report issued in corresponding European Application No. 22779125.8, dated Jul. 18, 2024, pp. 1-11.
3GPP TSG-WG SA2 Meeting #143E e-meeting, S2-2100889, "Discussion on System Level Impact of RedCap", China Mobile, Elbonia, Feb. 24-Mar. 9, 2021, total 5 pages.
3GPP TS 23.501 V16.8.0 (Mar. 2021), 3rd Generation Partnership Project; Technical Specification Group Services and System Aspects; System architecture for the 5G System (5GS); Stage 2 (Release 16), total 443 pages.
3GPP TSG-WG SA2 Meeting #146E e-meeting, S2-2106159, "eDRX enhancement for 10.24s cycle for RedCap", China Mobile, Elbonia, Aug. 16-27, 2021, total 3 pages.
3GPP TS 23.502 V17.0.0 (Mar. 2021), 3rd Generation Partnership Project; Technical Specification Group Services and System Aspects; Procedures for the 5G System (5GS); Stage 2 (Release 17), total 640 pages.
3GPP TSG-WG SA2 Meeting #147E e-meeting, S2-2107554, "eDRX enhancement for 10.24s cycle for RedCap", China Mobile, Elbonia, Oct. 18-22, 2021, total 3 pages.
3GPP TS 24.008 V3.6.0 (Dec. 2000), 3rd Generation Partnership Project; Technical Specification Group Core Network; Mobile radio interface layer 3 specification; Core Network Protocols—Stage 3 (Release 1999), total 435 pages.
International Search Report issued in corresponding International Application No. PCT/CN2022/084768, dated Jun. 22, 2022, pp. 1-11.

* cited by examiner

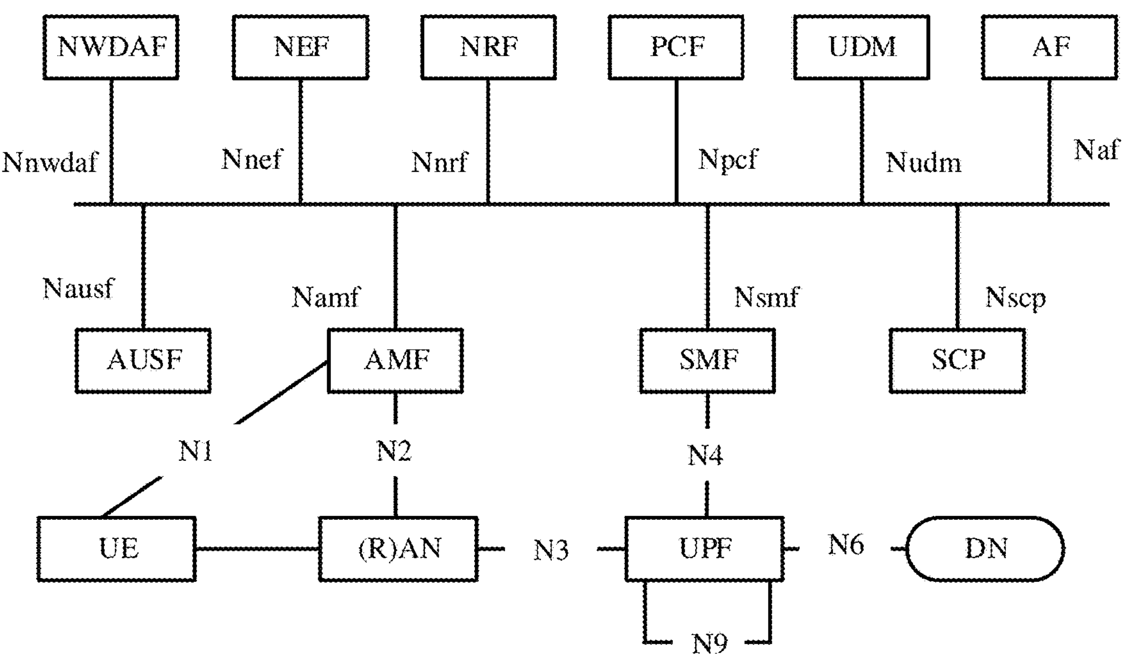

UE: User equipment (R)AN: (Radio) access network

UPF: User plane function

DN: Data network

AMF: Access and mobility management function

SMF: Session management function

NRF: Network repository function

N1: N1 interface

N3: N3 interface

N6: N6 interface

Namf: Service-based interface Namf

Nudm: Service-based interface Nudm

Naf: Service-based interface Naf

Nnef: Service-based interface Nnef

Nsmf: Service-based interface Nsmf

PCF: Policy control function

AF: Application function

UDM: Unified data management

AUSF: Authentication server function

NWDAF: Network data analytics function

NEF: Network exposure function

SCP: Service communications proxy

N2: N2 interface

N4: N4 interface

N9: N9 interface

Nausf: Service-based interface Nausf

Npcf: Service-based interface Npcf

Nnwdaf: Service-based interface Nnwdaf

Nnrf: Service-based interface Nnrf

Nscp: Service-based interface Nscp

FIG. 1

EXTENDED DISONTINUOUS RECEPTION PARAMETER CONFIGURATION METHOD AND APPARATUS

CROSS-REFERENCE TO RELATED APPLICATIONS

This application is a continuation of International Application No. PCT/CN2022/084768, filed on Apr. 1, 2022, which claims priority to Chinese Patent Application No. 202110363739.9, filed on Apr. 2, 2021. The disclosures of the aforementioned applications are hereby incorporated by reference in their entireties.

TECHNICAL FIELD

Embodiments discussed in the present application relate to the field of communication technologies, and in particular, to a communication method, apparatus, and system.

BACKGROUND

Reduced capability new radio (NR) (reduced capability NR, REDCAP) is introduced into the internet of things (IoT) in a 5th generation (5G) communication system. The technology is mainly applied to three application scenarios: video surveillance, industrial sensor networks, and wearable devices. To reduce power consumption of an internet of things terminal device, an extended discontinuous reception (eDRX) mechanism in a 4th generation (4G) IoT may be introduced into REDCAP.

In the 4G IoT, eDRX supports a paging time window (PTW). However, because REDCAP has a shorter eDRX cycle than the 4G IoT, eDRX does not support a PTW to reduce complexity of the terminal device. Therefore, when a 5G core network supports both 4G access and 5G access, how to ensure correct paging of a terminal device is an urgent technical problem to be resolved.

SUMMARY

Embodiments of the present application relate to a communication method, apparatus, and system, to ensure normal paging of a terminal device.

According to a first aspect, a communication method is disclosed. The communication method may be applied to an access and mobility management function (AMF) network element, or may be applied to a module (for example, a chip) in the AMF network element. An example in which the method is applied to the AMF network element is used below for description. The communication method may include: receiving indication information from a session management function (SMF) network element, where the indication information indicates that downlink data of a first terminal device arrives at a core network side; and when an eDRX cycle of the first terminal device is greater than or equal to a first threshold, sending an eDRX parameter to a first access network device based on capability information of the first terminal device and capability information of the first access network device, where the first access network device is any access network device in a tracking area (TA) list of the first terminal device.

In this embodiment, when the downlink data of the terminal device in an idle mode arrives at the core network side, the AMF network element may first determine whether the eDRX cycle of the terminal device is greater than or equal to the first threshold. When determining that the eDRX cycle of the terminal device is greater than or equal to the first threshold, the AMF network element may send the eDRX parameter to the access network device in the TA list of the terminal device based on the capability information of the terminal device and capability information of the access network device in the TA list of the terminal device. It can be ensured, by considering the capability information of the terminal device and the capability information of the access network device, that the eDRX parameter sent to the access network device is an appropriate eDRX parameter. Further, it can be ensured that the access network device can determine a correct paging occasion based on the received eDRX parameter, so that the access network device can page the terminal device on the paging occasion, to ensure correct paging of the terminal device.

In a possible implementation, the capability information of the first terminal device includes type information of a radio access technology (RAT) for accessing an access network device, the capability information of the first access network device includes information about a first RAT used by a terminal device to access the first access network device, the type information includes information about a first-type RAT and information about a second-type RAT, eDRX corresponding to the first-type RAT supports a PTW, and eDRX corresponding to the second-type RAT does not support a PTW. The sending an eDRX parameter to a first access network device based on capability information of the first terminal device and capability information of the first access network device includes: when the first RAT belongs to the first-type RAT, send a first eDRX parameter to the first access network device, where the first eDRX parameter includes a PTW parameter; and when the first RAT belongs to the second-type RAT, send a second eDRX parameter to the first access network device, where the second eDRX parameter does not include the PTW parameter.

In this embodiment, when the terminal device in the idle mode has downlink data arriving, the AMF network element may first determine whether the eDRX cycle of the terminal device is greater than or equal to the first threshold. When determining that the eDRX cycle of the terminal device is greater than or equal to the first threshold, the AMF network element may determine, based on the capability information of the terminal device, that the terminal device supports the first-type RAT and the second-type RAT. When an access network device in a TA area of the terminal device supports the first-type RAT, an eDRX parameter including a PTW parameter may be sent to the access network device. When the access network device in the TA area of the terminal device supports the second-type RAT, an eDRX parameter that does not include a PTW parameter may be sent to the access network device. It can be learned that when the terminal device in the idle mode has downlink data arriving, the eDRX cycle of the terminal device is greater than or equal to the first threshold, and the first terminal device supports the first-type RAT and the second-type RAT, the AMF network element may send, based on types of RATs corresponding to all access network devices in a TA area of the terminal device, different eDRX parameters to an access network device that supports different types of RATs, so that the access network device can determine a correct paging occasion based on the received eDRX parameters, and can page the terminal device on the paging occasion, to ensure correct paging of the terminal device.

In a possible implementation, the communication method may further include: receiving the capability information of the first terminal device; and when the eDRX cycle of the first terminal device is greater than or equal to the first threshold, sending the first eDRX parameter to the first terminal device based on the capability information of the first terminal device.

In this embodiment, the AMF network element may obtain the capability information of the terminal device, and may determine, based on the capability information of the terminal device, that the terminal device supports the first-type RAT and the second-type RAT. In this way, it can be ensured that in a process of negotiating the eDRX parameter of the terminal device, when the eDRX cycle of the terminal device is greater than or equal to the first threshold, the AMF network element can directly configure the eDRX parameter including the PTW parameter for the terminal device regardless of a type of a RAT currently used by the terminal device. Therefore, the terminal device may determine, based on the configured parameter and the type of the currently used RAT, whether to use the PTW parameter included in the eDRX parameter to determine the paging occasion. This can ensure that the terminal device can determine a correct paging occasion regardless of whether the type of the RAT used by the terminal device is the first-type RAT or the second-type RAT, and can wait for paging from the access network device on the paging occasion, thereby ensuring correct paging of the terminal device.

In a possible implementation, the receiving the capability information of the first terminal device includes: receiving the capability information of the first terminal device from the first terminal device.

In this embodiment, the AMF network element can directly receive the capability information from the terminal device, so that the AMF network element can deliver a correct paging parameter based on the capability information of the terminal device and the capability information of the access network device, thereby ensuring that the terminal device can be correctly paged while saving energy of the terminal device.

In a possible implementation, the receiving the capability information of the first terminal device includes: receiving the capability information of the first terminal device from a second access network device, where the second access network device is an access network device accessed by the first terminal device when the capability information of the first terminal device is received.

In this embodiment, based on a feature that the access network device can parse the radio capability information of the terminal device, the AMF network element may indirectly receive the capability information from the terminal device on an access network device side, so that the AMF network element can deliver a correct paging parameter based on the capability information of the terminal device and the capability information of the access network device, thereby ensuring that the terminal device can be correctly paged while saving energy.

According to a second aspect, a communication method is disclosed. The communication method may be applied to an AMF network element, or may be applied to a module (for example, a chip) in the AMF network element. An example in which the method is applied to the AMF network element is used below for description. The method may include: receiving capability information of a first terminal device, where the capability information of the first terminal device includes type information of a RAT for accessing an access network device, the type information includes information about a first-type RAT and information about a second-type RAT, eDRX corresponding to the first-type RAT supports a PTW, and eDRX corresponding to the second-type RAT does not support a PTW; and when an eDRX cycle of the first terminal device is greater than or equal to a first threshold, sending a first eDRX parameter to the first terminal device based on the capability information of the first terminal device, where the first eDRX parameter includes a PTW parameter.

In this embodiment, the AMF network element may obtain the capability information of the terminal device, and may determine, based on the capability information of the terminal device, that the terminal device supports the first-type RAT and the second-type RAT. In this way, it can be ensured that in a process of negotiating the eDRX parameter of the terminal device, when the eDRX cycle of the terminal device is greater than or equal to the first threshold, the AMF network element can directly configure the eDRX parameter including the PTW parameter for the terminal device regardless of a type of a RAT currently used by the terminal device. Therefore, the terminal device may determine, based on the configured eDRX parameter and the type of the currently used RAT, whether to use the PTW parameter included in the eDRX parameter to determine the paging occasion. This can ensure that the terminal device can determine a correct paging occasion regardless of whether the type of the RAT used by the terminal device is the first-type RAT or the second-type RAT, and can wait for paging from the access network device on the paging occasion, thereby ensuring correct paging of the terminal device.

In a possible implementation, the receiving capability information of a first terminal device includes: receiving the capability information of the first terminal device from the first terminal device.

In this embodiment, the AMF network element may directly receive the capability information from the terminal device, so that the AMF network element can deliver the complete eDRX parameter based on the capability information of the terminal device. This ensures that when the terminal device switches an idle mode, the terminal device can directly use an eDRX parameter corresponding to a RAT corresponding to a currently attached cell without performing eDRX parameter negotiation with a core network again. Therefore, correct paging of the terminal device can be ensured, and power consumption of the terminal device can be reduced.

In a possible implementation, the receiving capability information of a first terminal device includes: receiving the capability information of the first terminal device from a second access network device, where the second access network device is an access network device accessed by the first terminal device when the capability information of the first terminal device is received.

In this embodiment, based on a feature that the access network device can parse the radio capability information of the terminal device, the AMF network element may indirectly receive the capability information from the terminal device on an access network device side, so that the AMF network element can deliver the complete eDRX parameter based on the capability information of the terminal device. This ensures that when the terminal device switches an idle mode, the terminal device can directly use an eDRX parameter corresponding to a RAT corresponding to a currently attached cell without performing eDRX parameter negotiation with a core network again. Therefore, correct paging of the terminal device can be ensured, and power consumption of the terminal device can be reduced.

In a possible implementation, the communication method may further include: receiving indication information from a session management function SMF network element, where the indication information indicates that downlink data of the first terminal device arrives at a core network side; and separately sending the first eDRX parameter to all access network devices in a tracking area TA list corresponding to the first terminal device.

In this embodiment, when the terminal device in the idle mode has downlink data arriving, the AMF network element may determine whether the eDRX cycle of the terminal device is greater than or equal to the first threshold, and may determine, based on the capability information of the terminal device, whether the terminal device supports the first-type RAT and the second-type RAT. When determining that the eDRX cycle of the terminal device is greater than or equal to the first threshold and determining that the first terminal device supports the first-type RAT and the second-type RAT, the AMF network element may directly send a same eDRX parameter including the PTW parameter to all access network devices in a TA area of the terminal device, regardless of a type of a RAT currently used by the access network device. Therefore, the access network device can determine, based on the received eDRX parameter and the type of the currently used RAT (that is, a capability of the access network device), whether to use a PTW parameter included in the eDRX parameter to determine a paging occasion. This can ensure that the access network device can determine a correct paging occasion regardless of whether the type of the RAT used by the access network device is the first-type RAT or the second-type RAT, and can page the terminal device on the paging occasion, thereby ensuring correct paging of the terminal device.

According to a third aspect, a communication method is disclosed. The communication method may be applied to a first terminal device, or may be applied to a module (for example, a chip) in the first terminal device. An example in which the method is applied to the first terminal device is used below for description. The communication method may include: sending capability information of a first terminal device to an AMF network element, where the capability information of the first terminal device includes type information of a RAT for accessing an access network device, the type information includes information about a first-type RAT and information about a second-type RAT, eDRX corresponding to the first-type RAT supports a PTW, and eDRX corresponding to the second-type RAT does not support a PTW; and receiving a first eDRX parameter from the AMF network element, where the first eDRX parameter includes a PTW parameter; and when a current RAT corresponding to the first terminal device belongs to the first-type RAT, and an eDRX cycle of the first terminal device is greater than or equal to a first threshold, determining a PO based on the first eDRX parameter.

In this embodiment, the terminal device may send the capability information of the terminal device to the AMF network element, so that the AMF network element can determine, based on the capability information of the terminal device, that the terminal device supports the first-type RAT and the second-type RAT. In this way, it can be ensured that in a process of negotiating the eDRX parameter of the terminal device, when the eDRX cycle of the terminal device is greater than or equal to the first threshold, the AMF network element can directly configure the eDRX parameter including the PTW parameter for the terminal device regardless of a type of a RAT currently used by the terminal device. After receiving the eDRX parameter including the PTW parameter, the terminal device may first determine whether the currently used RAT belongs to the first-type RAT or the second-type RAT. When determining that the currently used RAT belongs to the first-type RAT, the terminal device may determine the paging occasion based on the eDRX parameter. In some embodiments, the terminal device may determine a PTW based on the PTW parameter and then determine the paging occasion based on the PTW. This can ensure that the terminal device can determine a correct paging occasion, and can wait for paging from the access network device on the paging occasion, thereby ensuring correct paging of the terminal device.

In a possible implementation, the communication method may further include: when the current RAT corresponding to the first terminal device belongs to the first-type RAT, but the eDRX cycle of the first terminal device is less than the first threshold, or when the current RAT corresponding to the first terminal device belongs to the second-type RAT, determining the PO based on a parameter in the first eDRX parameter other than the PTW parameter.

In this embodiment, the terminal device may send the capability information of the terminal device to the AMF network element, so that the AMF network element can determine, based on the capability information of the terminal device, that the terminal device supports the first-type RAT and the second-type RAT. In this way, it can be ensured that in a process of negotiating the eDRX parameter of the terminal device, when the eDRX cycle of the terminal device is greater than or equal to the first threshold, the AMF network element can directly configure the eDRX parameter including the PTW parameter for the terminal device regardless of a type of a RAT currently used by the terminal device. After receiving the eDRX parameter including the PTW parameter, the terminal device may first determine whether the currently used RAT belongs to the first-type RAT or the second-type RAT. When determining that the currently used RAT belongs to the second-type RAT, the terminal device may determine the paging occasion based on a parameter different from the PTW parameter in the eDRX parameter, that is, a PTW does not need to be determined. This can ensure that the terminal device can determine a correct paging occasion, and can wait for paging from the access network device on the paging occasion, thereby ensuring correct paging of the terminal device.

According to a fourth aspect, a communication method is disclosed. The communication method may be applied to an AMF network element, or may be applied to a module (for example, a chip) in the AMF network element. An example in which the method is applied to the AMF network element is used below for description. The communication method may include: receiving capability information of a first terminal device, where the capability information of the first terminal device includes type information of a radio access technology RAT for accessing an access network device, the type information includes information about a first-type RAT and information about a second-type RAT, extended discontinuous reception eDRX corresponding to the first-type RAT supports a paging time window PTW, and eDRX corresponding to the second-type RAT does not support a PTW; and sending first information to the first terminal device, where the first information includes information about a first tracking area TA list, the first TA list consists of a cell corresponding to a RAT in the first-type RAT, and a TA list of the first terminal device includes the first TA list.

In this embodiment, the AMF network element may obtain the capability information of the terminal device, and may determine, based on the capability information of the terminal device, that the terminal device supports the first-type RAT and the second-type RAT. Then, the AMF network element may allocate the first TA list to the terminal device based on a RAT currently used by the terminal device (that is, a RAT type currently supported by the terminal device), and may send the information about the first TA list to the terminal device. In this way, when cell reselection occurs, the terminal device can determine, based on the first TA list, whether the terminal device has moved out of an area corresponding to the first TA list.

In a possible implementation, the sending, by the AMF network element, first information to the first terminal device includes: when an eDRX cycle of the first terminal device is greater than or equal to a first threshold, sending the first information to the first terminal device.

In this embodiment, the AMF network element may obtain the capability information of the terminal device, may determine, based on the capability information of the terminal device, that the terminal device supports the first-type RAT and the second-type RAT, and may determine whether the eDRX cycle of the terminal device is greater than or equal to the first threshold. When determining that the eDRX cycle of the terminal device is greater than or equal to the first threshold, the AMF network element may allocate the first TA list to the terminal device based on the RAT currently used by the terminal device (that is, the RAT type currently supported by the terminal device), and then may send the information about the first TA list to the terminal device. In this way, when cell reselection occurs, the terminal device can determine, based on the first TA list, whether the terminal device has moved out of an area corresponding to the first TA list.

In a possible implementation, the receiving, by an AMF network element, capability information of a first terminal device includes: receiving the capability information of the first terminal device from the first terminal device.

In this embodiment, the AMF network element may directly receive the capability information from the terminal device, to determine that the terminal device supports the first-type RAT and the second-type RAT. Then, the AMF network element allocates the first TA list to the terminal device based on the RAT currently used by the terminal device (that is, the RAT type currently supported by the terminal device). In this way, when cell reselection occurs, the terminal device can determine, based on the first TA list, whether the terminal device has moved out of an area corresponding to the first TA list. This triggers a mobility registration update procedure, to re-negotiate and re-determine an eDRX parameter.

In a possible implementation, the receiving capability information of a first terminal device includes: receiving the capability information of the first terminal device from a second access network device, where the second access network device is an access network device accessed by the first terminal device when the capability information of the first terminal device is received.

In this embodiment, based on a feature that an access network device can parse the radio capability information of the terminal device, the AMF network element may indirectly receive the capability information of the terminal device on an access network device side, to determine that the terminal device supports the first-type RAT and the second-type RAT. Then, the AMF network element allocates the first TA list to the terminal device based on the RAT currently used by the terminal device (that is, the RAT type currently supported by the terminal device). In this way, when cell reselection occurs, the terminal device can determine, based on the first TA list, whether the terminal device has moved out of an area corresponding to the first TA list. This triggers a mobility registration update procedure, to re-negotiate and re-determine an eDRX parameter.

In a possible implementation, the sending first information to the first terminal device includes: sending the first information and a third eDRX parameter to the first terminal device. The communication method may further include: receiving a mobility registration update request from the first terminal device, where the mobility registration update request indicates that the first terminal device moves out of an area corresponding to the first TA list; and sending second information and a fourth eDRX parameter to the first terminal device, where the second information includes information about a second TA list, the second TA list includes of a cell corresponding to a RAT in the second-type RAT, and the TA list of the first terminal device includes the second TA list, where when the third eDRX parameter includes a PTW parameter, the fourth eDRX parameter does not include the PTW parameter; or when the third eDRX parameter does not include a PTW parameter, the fourth eDRX parameter includes the PTW parameter.

In this embodiment, the AMF network element may obtain the capability information of the terminal device, may determine, based on the capability information of the terminal device, that the terminal device supports the first-type RAT and the second-type RAT, and then may determine whether the eDRX cycle of the terminal device is greater than or equal to the first threshold. When determining that the eDRX cycle of the terminal device is greater than or equal to the first threshold, the AMF network element may allocate the first TA list and an eDRX parameter to the terminal device based on the RAT currently used by the terminal device (that is, the RAT type currently supported by the terminal device), and then may send the information about the first TA list and the eDRX parameter to the terminal device. In this way, when being in an area corresponding to first TA list, the terminal device can use the eDRX parameter to determine the paging occasion. When the terminal device moves out of the area corresponding to the first TA list, the AMF network element may reallocate the second TA list and another eDRX parameter to the terminal device, and then may send the information about the second TA list and the another eDRX parameter to the terminal device. In this way, when being in an area corresponding to the second TA list, the terminal device can use the another eDRX parameter to determine the paging occasion. It can be learned that, to avoid a conflict of an eDRX parameter supported by the terminal device in an idle mode due to cell reselection of the terminal device, whether the terminal device supports a plurality of types of RAT and the eDRX cycle of the terminal device are considered during TA list configuration. Different TA lists are allocated to the terminal device in different types of RATs, to ensure that a mobility registration update procedure is triggered when the terminal device in the idle mode performs cross-RAT cell reselection. In this way, a core network can sense a change of the RAT used by the terminal device, and configure an eDRX parameter of a corresponding RAT type for the terminal device, thereby ensuring correct paging of the terminal device.

According to a fifth aspect, a communication method is disclosed. The communication method may be applied to a first terminal device, or may be applied to a module (for example, a chip) in the first terminal device. An example in which the method is applied to the first terminal device is used below for description. The communication method may include: sending capability information of the first terminal device to an AMF network element, where the capability information of the first terminal device includes type information of a RAT for accessing an access network device, the type information includes information about a first-type RAT and information about a second-type RAT, eDRX corresponding to the first-type RAT supports a PTW, and eDRX corresponding to the second-type RAT does not support a PTW; and receiving first information from the AMF network element, where the first information includes information about a first TA list, the first TA list includes of a cell corresponding to a RAT in the first-type RAT, and a TA list of the first terminal device includes the first TA list.

In this embodiment, the terminal device may send the capability information of the terminal device to an access network device, so that the AMF network element can determine, based on the capability information of the terminal device, that the terminal device supports the first-type RAT and the second-type RAT. Then, the AMF network element may allocate the first TA list to the terminal device based on a RAT currently used by the terminal device (that is, a RAT type currently supported by the terminal device). After receiving the information about the first TA list from the AMF network element, when cell reselection occurs, the terminal device can determine, based on the first TA list, whether the terminal device has moved out of an area corresponding to the first TA list.

In a possible implementation, the sending capability information of the first terminal device to an AMF network element includes: sending the radio capability information of the first terminal device to a second access network device, where the second access network device is an access network device accessed by the first terminal device when the radio capability information is sent.

In a possible implementation, the receiving first information from the AMF network element includes: receiving the first information and a third eDRX parameter from the AMF network element. The communication method may further include: when the first terminal device moves out of an area corresponding to the first TA list, sending a mobility registration update request to the AMF network element, where the mobility registration update request indicates that the first terminal device moves out of the area corresponding to the first TA list; and receiving second information and a fourth eDRX parameter from the AMF network element, where the second information includes information about a second TA list, the second TA list includes of a cell corresponding to a RAT in the second-type RAT, and the TA list of the first terminal device includes the second TA list, where when the third eDRX parameter includes a PTW parameter, the fourth eDRX parameter does not include the PTW parameter; or when the third eDRX parameter does not include a PTW parameter, the fourth eDRX parameter includes the PTW parameter.

In this embodiment, the terminal device may send the capability information of the terminal device to the access network device, so that the AMF network element can determine, based on the capability information of the terminal device, that the terminal device supports the first-type RAT and the second-type RAT, and then may determine whether the eDRX cycle of the terminal device is greater than or equal to the first threshold. When determining that the eDRX cycle of the terminal device is greater than or equal to the first threshold, the AMF network element may allocate the first TA list and an eDRX parameter to the terminal device based on the RAT currently used by the terminal device (that is, the RAT type currently supported by the terminal device). After receiving the first TA list and the eDRX parameter from the AMF network element, the terminal device may use the eDRX parameter to determine the paging occasion in the area corresponding to the first TA list. When the terminal device moves out of the area corresponding to the first TA list, the terminal device may send a mobility registration update request to the AMF network element, so that the AMF network element can reallocate the second TA list and another eDRX parameter to the terminal device. After receiving the information about the second TA list and the another eDRX parameter from the AMF network element, the terminal device may use the another eDRX parameter to determine the paging occasion in the area corresponding to the second TA list. It can be learned that, to avoid a conflict of an eDRX parameter supported by the terminal device in an idle mode due to cell reselection of the terminal device, whether the terminal device supports a multi-type RAT capability and the eDRX cycle of the terminal device are considered during TA list configuration. Different TA lists are allocated to the terminal device in different types of RATs, to ensure that an update procedure is triggered when the terminal device in the idle mode performs cross-RAT cell reselection. In this way, a core network can sense a change of the RAT used by the terminal device, and configure an eDRX parameter of a corresponding RAT type for the terminal device, thereby ensuring correct paging of the terminal device.

According to a sixth aspect, a communication apparatus is disclosed. The communication apparatus may be an AMF network element, or may be a module (for example, a chip) in the AMF network element. The communication apparatus may include: a receiving unit, configured to receive indication information from an SMF network element, where the indication information indicates that downlink data of a first terminal device arrives at a core network side; and a sending unit, configured to: when an eDRX cycle of the first terminal device is greater than or equal to a first threshold, send an eDRX parameter to a first access network device based on capability information of the first terminal device and capability information of the first access network device, where the first access network device is any access network device in a TA list of the first terminal device.

In a possible implementation, the capability information of the first terminal device includes type information of a RAT for accessing an access network device, the capability information of the first access network device includes information about a first RAT used by a terminal device to access the first access network device, the type information includes information about a first-type RAT and information about a second-type RAT, eDRX corresponding to the first-type RAT supports a PTW, and eDRX corresponding to the second-type RAT does not support a PTW. The sending unit is configured to: when the first RAT belongs to the first-type RAT, send a first eDRX parameter to the first access network device, where the first eDRX parameter includes a PTW parameter; and when the first RAT belongs to the second-type RAT, send a second eDRX parameter to the first access network device, where the second eDRX parameter does not include the PTW parameter.

In a possible implementation, the receiving unit is further configured to receive the capability information of the first terminal device. The sending unit is further configured to: when the eDRX cycle of the first terminal device is greater than or equal to the first threshold, send the first eDRX parameter to the first terminal device based on the capability information of the first terminal device.

In a possible implementation, that the receiving unit receives the capability information of the first terminal device includes: receiving the capability information of the first terminal device from the first terminal device.

In a possible implementation, that the receiving unit receives the capability information of the first terminal device includes: receiving the capability information of the first terminal device from a second access network device, where the second access network device is an access network device accessed by the first terminal device when the capability information of the first terminal device is received.

According to a seventh aspect, a communication apparatus is disclosed. The communication apparatus may be an AMF network element, or may be a module (for example, a chip) in the AMF network element. The communication apparatus may include: a receiving unit, configured to receive capability information of a first terminal device, where the capability information of the first terminal device includes type information of a RAT for accessing an access network device, the type information includes information about a first-type RAT and information about a second-type RAT, eDRX corresponding to the first-type RAT supports a PTW, and eDRX corresponding to the second-type RAT does not support a PTW; and a sending unit, configured to: when an eDRX cycle of the first terminal device is greater than or equal to a first threshold, send a first eDRX parameter to the first terminal device based on the capability information of the first terminal device, where the first eDRX parameter includes a PTW parameter.

In a possible implementation, the receiving unit is configured to receive the capability information of the first terminal device from the first terminal device.

In a possible implementation, the receiving unit is configured to receive the capability information of the first terminal device from a second access network device, where the second access network device is an access network device accessed by the first terminal device when the capability information of the first terminal device is received.

In a possible implementation, the receiving unit is further configured to receive indication information from a session management function SMF network element, where the indication information indicates that downlink data of the first terminal device arrives at a core network side; and the sending unit is further configured to separately send the first eDRX parameter to all access network devices in a TA list corresponding to the first terminal device.

According to an eighth aspect, a communication apparatus is disclosed. The communication apparatus may be a first terminal device or a module (for example, a chip) in the first terminal device. The communication apparatus may include: a sending unit, configured to send capability information of the first terminal device to an AMF network element, where the capability information of the first terminal device includes type information of a RAT for accessing an access network device, the type information includes information about a first-type RAT and information about a second-type RAT, eDRX corresponding to the first-type RAT supports a PTW, and eDRX corresponding to the second-type RAT does not support a PTW; a receiving unit, configured to receive a first eDRX parameter from the AMF network element, where the first eDRX parameter includes a PTW parameter; and a determining unit, configured to: when a current RAT corresponding to the first terminal device belongs to the first-type RAT, and an eDRX cycle of the first terminal device is greater than or equal to a first threshold, determine a PO based on the first eDRX parameter.

In a possible implementation, the determining unit is further configured to: when the current RAT corresponding to the first terminal device belongs to the first-type RAT, but the eDRX cycle of the first terminal device is less than the first threshold, or when the current RAT corresponding to the first terminal device belongs to the second-type RAT, determine the PO based on a parameter in the first eDRX parameter other than the PTW parameter.

According to a ninth aspect, a communication apparatus is disclosed. The communication apparatus may be an AMF network element, or may be a module (for example, a chip) in the AMF network element. The communication apparatus may include: a receiving unit, configured to receive capability information of a first terminal device, where the capability information of the first terminal device includes type information of a RAT for accessing an access network device, the type information includes information about a first-type RAT and information about a second-type RAT, eDRX corresponding to the first-type RAT supports a PTW, and eDRX corresponding to the second-type RAT does not support a PTW; and a sending unit, configured to send first information to the first terminal device, where the first information includes information about a first TA list, the first TA list includes of a cell corresponding to a RAT in the first-type RAT, and a TA list of the first terminal device includes the first TA list.

In a possible implementation, the sending unit is configured to: when an eDRX cycle of the first terminal device is greater than or equal to a first threshold, send the first information to the first terminal device.

In a possible implementation, the receiving unit is configured to receive the capability information of the first terminal device from the first terminal device.

In a possible implementation, the receiving unit is configured to receive the capability information of the first terminal device from a second access network device, where the second access network device is an access network device accessed by the first terminal device when the capability information of the first terminal device is received.

In a possible implementation, that the sending unit sends the first information to the first terminal device includes: sending the first information and a third eDRX parameter to the first terminal device. The receiving unit is further configured to receive a mobility registration update request from the first terminal device, where the mobility registration update request indicates that the first terminal device moves out of an area corresponding to the first TA list. The sending unit is further configured to send second information and a fourth eDRX parameter to the first terminal device, where the second information includes information about a second TA list, the second TA list includes of a cell corresponding to a RAT in the second-type RAT, and the TA list of the first terminal device includes the second TA list, where when the third eDRX parameter includes a PTW parameter, the fourth eDRX parameter does not include the PTW parameter; or when the third eDRX parameter does not include a PTW parameter, the fourth eDRX parameter includes the PTW parameter.

According to a tenth aspect, a communication apparatus is disclosed. The communication apparatus may be a first terminal device or a module (for example, a chip) in the first terminal device. The communication apparatus may include: a sending unit, configured to send capability information of the first terminal device to an AMF network element, where the capability information of the first terminal device includes type information of a RAT for accessing an access network device, the type information includes information about a first-type RAT and information about a second-type RAT, eDRX corresponding to the first-type RAT supports a PTW, and eDRX corresponding to the second-type RAT does not support a PTW; a receiving unit, configured to receive first information from the AMF network element, where the first information includes information about a first TA list, the first TA list includes of a cell corresponding to a RAT in the first-type RAT, and a TA list of the first terminal device includes the first TA list.

In a possible implementation, the sending unit is configured to send the radio capability information of the first terminal device to a second access network device, where the second access network device is an access network device accessed by the first terminal device when the radio capability information is sent.

In a possible implementation, the receiving unit is configured to receive the first information and a third eDRX parameter from the AMF network element. The sending unit is further configured to: when the first terminal device moves out of an area corresponding to the first TA list, send a mobility registration update request to the AMF network element, where the mobility registration update request indicates that the first terminal device moves out of the area corresponding to the first TA list; and the receiving unit is further configured to receive second information and a fourth eDRX parameter from the AMF network element, where the second information includes information about a second TA list, the second TA list includes of a cell corresponding to a RAT in the second-type RAT, and the TA list of the first terminal device includes the second TA list, where when the third eDRX parameter includes a PTW parameter, the fourth eDRX parameter does not include the PTW parameter; or when the third eDRX parameter does not include a PTW parameter, the fourth eDRX parameter includes the PTW parameter.

According to an eleventh aspect, a communication apparatus is disclosed. The communication apparatus may be an AMF network element or a module (for example, a chip) in the AMF network element. The communication apparatus may include a processor, a memory, an input interface, and an output interface. The input interface is configured to receive information from another communication apparatus different from the communication apparatus. The output interface is configured to output information to the another communication apparatus different from the communication apparatus. When the processor executes a computer program stored in the memory, the processor is enabled to perform the communication method of any one of the first aspect or the implementations of the first aspect (or the second aspect or the implementations of the second aspect).

According to a twelfth aspect, a communication apparatus is disclosed. The communication apparatus may be a first terminal device or a module (for example, a chip) in the first terminal device. The communication apparatus may include a processor, a memory, an input interface, and an output interface. The input interface is configured to receive information from another communication apparatus different from the communication apparatus. The output interface is configured to output information to the another communication apparatus different from the communication apparatus. When the processor executes a computer program stored in the memory, the processor is enabled to perform the communication method in accordance with any one of the third aspect or the implementations of the third aspect.

According to a thirteenth aspect, a communication apparatus is disclosed. The communication apparatus may be an AMF network element or a module (for example, a chip) in the AMF network element. The communication apparatus may include a processor, a memory, an input interface, and an output interface. The input interface is configured to receive information from another communication apparatus different from the communication apparatus. The output interface is configured to output information to the another communication apparatus different from the communication apparatus. When the processor executes a computer program stored in the memory, the processor is enabled to perform the communication method in accordance with any one of the fourth aspect or the implementations of the fourth aspect.

According to a fourteenth aspect, a communication apparatus is disclosed. The communication apparatus may be a first terminal device or a module (for example, a chip) in the first terminal device. The communication apparatus may include a processor, a memory, an input interface, and an output interface. The input interface is configured to receive information from another communication apparatus different from the communication apparatus. The output interface is configured to output information to the another communication apparatus different from the communication apparatus. When the processor executes a computer program stored in the memory, the processor is enabled to perform the communication method in accordance with any one of the fifth aspect or the implementations of the fifth aspect.

According to a fifteenth aspect, a communication system is disclosed. The communication system includes the communication apparatus in the eleventh aspect and the communication apparatus in the twelfth aspect; or the communication system includes the communication apparatus in the thirteenth aspect and the communication apparatus in the fourteenth aspect.

According to a sixteenth aspect, a computer-readable storage medium is disclosed. The computer-readable storage medium stores a computer program or computer instructions. When the computer program or the computer instructions are run, the communication method according to the foregoing aspects is implemented.

According to a seventeenth aspect, a chip is disclosed. The chip includes a processor, configured to execute a program stored in a memory. When the program is executed, the chip is enabled to perform the foregoing method.

In a possible implementation, the memory is located outside the chip.

According to an eighteenth aspect, a computer program product is disclosed. The computer program product includes computer program code. When the computer program code is executed, the foregoing communication method is performed.

BRIEF DESCRIPTION OF DRAWINGS

FIG. 1 is a schematic diagram of a network architecture according to an embodiment;

DESCRIPTION OF EMBODIMENTS

Figure 2:
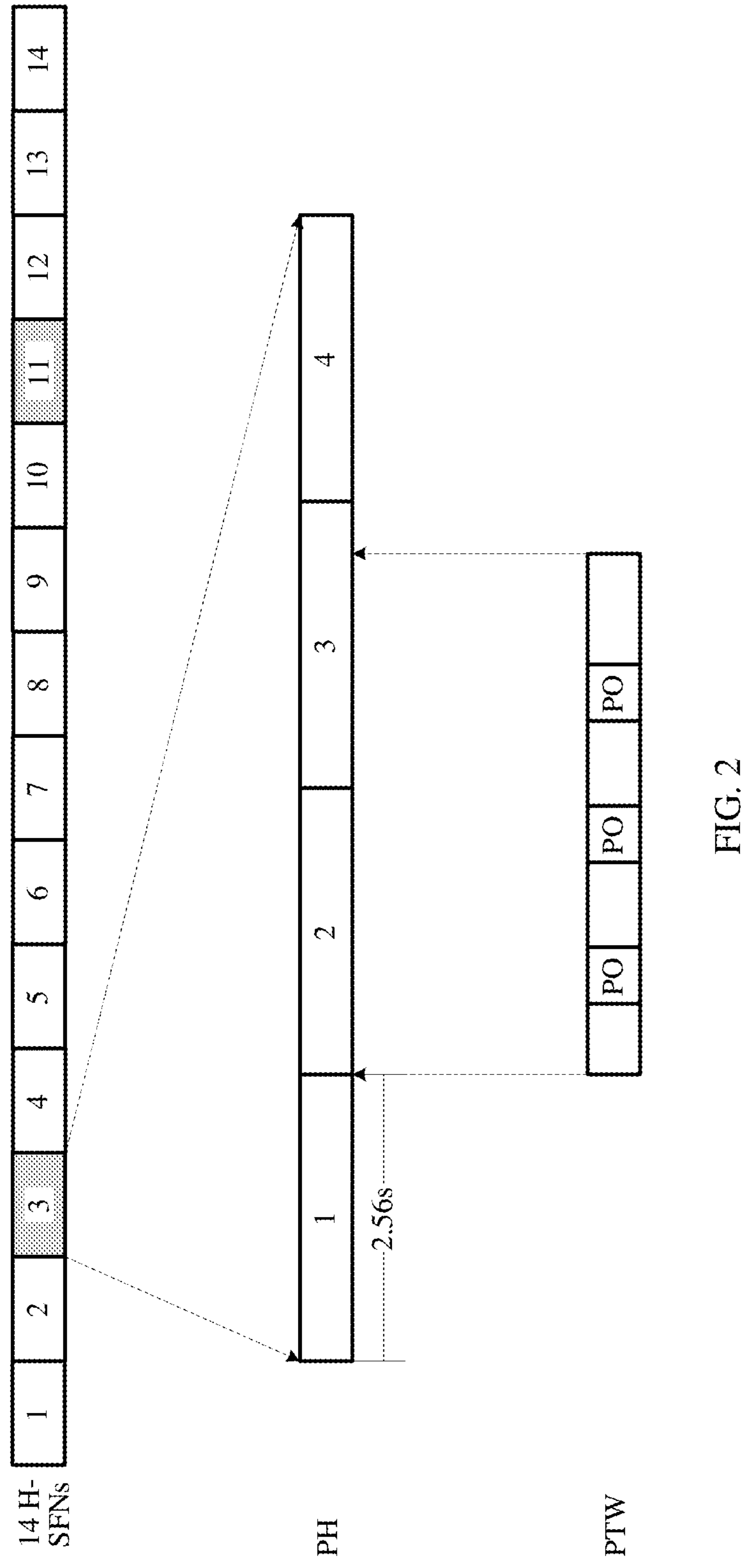
FIG. 2 is a schematic diagram of an H-SFN frame according to an embodiment.

Embodiments of the present application relate to a communication method, apparatus, and system, to ensure normal paging of a terminal device. Details are separately described below.

To better understand the communication method, apparatus, and system according to various embodiments, the following first describes a network architecture used for one or more embodiments. FIG. 1 is a schematic diagram of a network architecture according to an embodiment of this application. As shown in FIG. 1, the network architecture may include user equipment (UE), a radio access network ((R)AN) device, a user plane function (UPF) network element, a data network (DN), an access and mobility management function (AMF) network element, a session management function (SMF) network element, a policy control function (PCF) network element, an application function (AF) network element, a unified data management (UDM) network element, an authentication server function (AUSF) network element, a network data analytics function (NWDAF) network element, a network exposure function (NEF) network element, a network repository function (NRF) network element, and a service communication proxy (SCP) network element. The UE and the (R)AN device may directly communicate with each other. The UE may communicate with the AMF network element through an N1 interface. The (R)AN device may communicate with the AMF network element through an N2 interface. The (R)AN device may communicate with the UPF network element through an N3 interface. The UPF network element may communicate with the SMF network element through an N4 interface. The UPF network element may communicate with the DN through an N6 interface. The UPF network elements may communicate with each other through an N9 interface. The AMF network element may provide a service-based interface Namf, the SMF network element may provide a service-based interface Nsmf, the AUSF network element may provide a service-based interface Nausf, the UDM network element may provide a service-based interface Nudm, the PCF network element may provide a service-based interface Npcf, the AF network element may provide a service-based interface Naf, the NWDAF network element may provide a service-based interface Nnwdaf, the NEF network element may provide a service-based interface Nnef, the NRF network element may provide a service-based interface Nnrf, and the SCP network element may provide a service-based interface Nscp. The AMF network element, the SMF network element, the UDM network element, the PCF network element, the AF network element, the AUSF network element, the NWDAF network element, the NEF network element, the NRF network element, and the SCP network element may communicate with each other through service-based interfaces.

The UE may also be referred to as a terminal device, a mobile station (MS), a mobile terminal (MT), or the like, and is a device that provides voice and/or data connectivity for a user. The terminal device may be a handheld terminal, a notebook computer, a subscriber unit, a cellular phone, a smart phone, a wireless data card, a personal digital assistant (PDA) computer, a tablet computer, a wireless modem, a handheld device, a laptop computer, a cordless telephone, a wireless local loop ( ), a machine type communication (MTC) terminal, a wearable device (such as a smart watch, a smart band, or a pedometer), a vehicle-mounted device (such as a car, a bicycle, an electric vehicle, an airplane, a ship, a train, or a high-speed railway), an virtual reality (VR) device, an augmented reality (AR) device, a wireless terminal in industrial control, a smart home device (such as a refrigerator, a television, an air conditioner, and a meter), a smart robot, a workshop device, a wireless terminal in self-driving, a wireless terminal in remote medical surgery, a wireless terminal in a smart grid, a wireless terminal in transport safety, a wireless terminal in a smart city, a wireless terminal in a smart home, a flight device (such as a smart robot, a hot air balloon, a drone, or an airplane), or another device that can access a network. In FIG. 1, the terminal device is shown as the UE, which is merely used as an example and imposes no limitation on the terminal device. The UE may access the DN by establishing a session, that is, a protocol data unit (PDU) session, among the UE, the (R)AN device, the UPF network element, and the DN.

The (R)AN device is a device that provides radio access for the UE, and is mainly responsible for functions such as radio resource management, quality of service (QoS) flow management, and data compression and encryption on an air interface side. The (R)AN device may include base stations in various forms, for example, a macro base station, a micro base station (also referred to as a small cell), a relay station, and an access point. The (R)AN device may further include a wireless fidelity (Wi-Fi) access point (AP). The (R)AN device may further include a worldwide interoperability for microwave access (WiMax) base station (BS).

The UPF network element is mainly responsible for content related to a user plane, for example, data packet routing and transmission, a mobility anchor, an uplink classifier for supporting routing of a service flow to the data network, and a branching point for supporting a multi-homed protocol data unit (PDU) session, packet detection, service usage reporting, quality of service (QoS) processing, lawful interception, and downlink packet storage.

The DN may be an internet, an internet protocol (IP) multi-media service (IMS) network, an area network, that is, a local network, for example, a multi-access edge computing (MEC) network, or the like. The DN is a destination that a PDU session of the UE accesses. The DN includes or is deployed with an application server, and the application server may perform data transmission with the UE, to provide a service for the UE.

The AMF network element may complete functions related to access and mobility, such as connection management, a registration procedure, mobility management, access authentication and authorization management, reachability management, security context management, and SMF network element selection.

The SMF network element is mainly responsible for session-related functions such as session management in a mobile network, UPF network element selection and control, service and session continuity (SSC) mode selection, and roaming. The session management may include session establishment, modification, release, update, and the like. The session management may further include maintenance of tunnel between the UPF network element and an access network (AN) device.

The PCF network element may be responsible for policy-related functions such as unified policy formulation, policy control provision, and obtaining subscription information related to policy decision from the unified data storage (UDR) network element. The policy control provision may include providing service data flow and application-based detection, gating, QoS, flow-based charging control, and the like.

The AF network element mainly supports interaction with a 3rd generation partnership project (3GPP) core network to provide a service, to affect service flow routing, access network capability exposure, policy control, and the like, and may interact with the NEF network element or the like.

The UDM network element is responsible for user key management, user identifier processing, access authorization of subscription data, network function entity management of the UE, session and service continuity management, short message pushing, lawful interception, access authorization, registration and mobility management, subscription management, short message management, and user data management and control, such as subscription information management.

The AUSF network element may be responsible for performing authentication and authorization on access of the UE, for example, generating an intermediate key.

The NWDAF network element provides network data collection and analysis functions based on technologies such as big data and artificial intelligence.

The NRF network element is mainly responsible for a service discovery function, and maintains network function (NF) text of available NF instances and services supported by the NF instances.

The NEF network element is mainly responsible for securely opening a service and a capability provided by a 3GPP network function, such as internal opening or opening to a third party; and converting or translating information exchanged with the AF network element and information exchanged with an internal network function, such as an AF service identifier and internal 5G core network information, for example, a data network name (DNN) and single NSSAI (S-NSSAI).

The SCP network element is responsible for indirect communication between network elements.

Each of the foregoing network elements in the core network may also be referred to as a functional entity, and may be a network element implemented on dedicated hardware, or may be a software instance running on dedicated hardware, or an instance of a virtualization function on an appropriate platform. For example, the virtualization platform may be a cloud platform.

It should be noted that the system architecture shown in FIG. 1 is not limited to including only the network elements and devices shown in the figure, and may further include other network elements or devices that are not shown in the figure. Specific examples are not listed herein.

It should be noted that a distribution form of network elements in the core network is not limited in one or more embodiments. The distribution form shown in FIG. 1 is merely an example, and is not limited.

It should be understood that names of all network elements are merely used as examples. In future communication, for example, a 6th generation mobile network (6G), the network elements may also have other names. Alternatively, in future communication, for example, 6G, the network elements may be replaced with other entities or devices with same functions. This is not limited in. Unified descriptions are provided herein, and details are not described below again.

It should be noted that the network architecture of the 5th generation mobile network (5G) shown in FIG. 1 does not constitute a limitation on the 5G network. Optionally, the method in accordance with one or more embodiments is further applicable to various future communication systems, for example, 6G or other communication networks.

To better understand the various embodiments, the following first describes related technologies in accordance with one or more embodiments.

Massive machine type communication (mMTC) is one of the important application scenarios of a 5G network, and is mainly oriented to various internet of things (IoT) service applications based on a cellular network. To meet a low power consumption requirement of IoT devices, the 3rd generation partnership project (3GPP) has started research on energy saving technologies for IoT devices since R10. Based on an energy saving mode, a discontinuous reception (DRX) technology, and an idle mode DRX technology, a transceiver antenna of an IoT device is disabled when there is no communication service requirement, so that the IoT device enters a sleep state. This can greatly reduce power consumption of the IoT device, improve a battery life of the IoT device, and ensure that a single device can be used for 5 to 10 years.

In a fourth generation mobile network (4G) IoT (long term evolution machine to machine (LTE-M) and narrowband internet of things (NB-IoT)), to further reduce power consumption of an IoT device, extended DRX (eDRX) is introduced. For idle mode eDRX, UE may send a required eDRX parameter to a mobility management entity (MME) in an attach procedure. After receiving the required eDRX parameter from the UE, the MME may determine an eDRX parameter of the UE, and send the determined eDRX parameter of the UE to the UE. After the UE enters the idle mode, when downlink data arrives, the MME may send the eDRX parameter of the UE to an access network device, to ensure that the access network device can page the UE at a correct moment. The required eDRX parameter sent by the UE to the MME may be the same as or different from the eDRX parameter of the UE sent by the MME to the UE. The eDRX parameter of the UE is determined by the MME based on the required eDRX parameter sent by the UE, subscription information of the UE, and the like.

Different from those of low-power wide-area (LPWA), application scenarios of new radio (NR) machine type communication (MTC) may include video surveillance (for example, a surveillance camera), industrial wireless sensor network (IWSN) (for example, a temperature sensor or a pressure sensor), a wearable device (for example, a smart band, a smart watch, or smart glasses), and the like. In research of R17, a lightweight NR technology is introduced as an IoT-oriented 5G NR air interface technology, that is, a reduced capability NR (REDCAP) technology. This technology is designed for high-end IoT application scenarios such as video surveillance, industrial sensor networks, and wearable devices to make up for legacy scenarios of 4G IoT (LTE-M and NB-IoT).

An energy saving technology, especially idle mode extended DRX (eDRX), in REDCAP is also discussed in the standard. The original 5G NR access technology does not support eDRX. Therefore, the discussion of the REDCAP eDRX technology mainly relies on an eDRX mechanism of conventional IoT technologies such as NB-IoT and eMTC in 4G.

For idle mode eDRX, the UE may send a required eDRX parameter to an AMF network element in a registration process. After receiving the required eDRX parameter from the UE, the AMF network element may determine an eDRX parameter, and send the determined eDRX parameter to the UE. After the UE enters the idle mode, when downlink data arrives, the AMF network element may send the determined eDRX parameter to an access network device, to ensure that the access network device can page the UE at a correct moment.

For UE in conventional long term evolution (LTE) and LTE enhanced MTC (eMTC), a cycle of idle mode eDRX ranges from 5.12s to 2621.44s (about 44 minutes). For NB-IoT UE, a cycle of idle mode eDRX ranges from 20.48s to 10485.76s (about 3 hours). For UE with a cycle longer than 10.24s, a hyper system frame number (H-SFN) and a paging time window (PTW) mechanism are used in a paging process regardless of whether the UE is NB-IoT, eMTC, or conventional LTE UE.

The H-SFN is a concept based on a conventional system frame number (SFN) frame. A length of a superframe is about 10.24s, that is, a length of 1024 SFN frames. The H-SFN is mainly for performing time synchronization at a superframe granularity between the access network device and the AMF network element, to ensure that when finding that the UE is in an eDRX state, the AMF network element can send a paging request to the access network device before corresponding paging superframe time expires, to trigger the access network device to page target UE within next superframe time. In addition, the AMF network element may further configure a PTW in the eDRX parameter, that is, the UE is in a reachability state (that is, can be paged in a network) only in the PTW. The network cannot perform paging beyond the time.

FIG. 2 is a schematic diagram of an H-SFN frame according to an embodiment. As shown in FIG. 2, there are 14 H-SFN frames, and one paging H-SFN (PH) includes four frames each with a length of 2.56s, that is, four 256 SFN frames. UE is paged on a paging occasion (PO) in a PTW of this superframe.

When the UE is in idle mode eDRX and an eDRX cycle is greater than or equal to 10.24s, when downlink data arrives in a network, an AMF network element may send an eDRX parameter to an access network device. The access network device may first calculate a PTW based on the eDRX parameter, and then calculate a PO in the PTW.

An eDRX cycle in 4G IoT is long, and an eDRX cycle in REDCAP is short. Therefore, in REDCAP, to reduce complexity of UE, a PH and a PTW are no longer used in eDRX, that is, the eDRX does not support the PH and the PTW. In other words, when the eDRX cycle is greater than or equal to 10.24s, the PH and the PTW are no longer used.

When a 5G core network supports both 4G and REDCAP, the following problems may exist:

1. After UE that registers with a 5G core network (5GC) through LTE/LTE-M enters an idle mode, if idle mode cell reselection occurs, the UE reselects to a REDCAP cell.

When downlink data arrives, if the eDRX cycle is greater than or equal to 10.24s, the AMF network element considers that the UE still supports the PTW and the PH, and sends a PTW parameter to the access network device. The access network device calculates the PTW by using the PTW parameter, and then may calculate the PO by using the PTW. The UE calculates a PO by using a conventional method and waits for paging in the corresponding PO. Therefore, the PO calculated by the access network device may be different from the PO calculated by the UE, and the access network device cannot page the UE in the calculated PO.

2. After UE that registers with a 5GC from REDCAP enters an idle mode, if idle mode cell reselection occurs, the UE reselects to an LTE/LTE-M cell.

When downlink data arrives, if the eDRX cycle is greater than or equal to 10.24s, the AMF network element sends, to all access network devices, an eDRX parameter that does not carry a PTW parameter. An LTE/LTE-M access network device calculates a PO by using a conventional method, and the UE calculates a PO based on the PTW and waits for paging in the calculated PO. It can be learned that, the UE cannot be paged because the PO calculated by the access network device is different from the PO calculated by the UE. In addition, because the UE first needs to calculate the PTW and then calculates the PO based on the PTW, power consumption is large.

Therefore, when the 5GC supports both LTE access and REDCAP access, how to ensure eDRX paging when the UE is handed over between different radio access technologies (RAT) becomes a technical problem to be urgently resolved.

It should be understood that, in addition to REDCAP and LTE described above, the RAT may be another access technology, and a quantity of access technologies may not be limited. Therefore, to cover all possibilities, classify access technologies may be classified into two types of access technologies, that is, a first-type RAT and a second-type RAT. eDRX corresponding to the first-type RAT supports a PTW, and eDRX corresponding to the second-type RAT does not support a PTW. Both the first-type RAT and the second-type RAT may include one or more RATs. That eDRX corresponding to the first-type RAT supports a PTW may be understood as: When an eDRX cycle is greater than or equal to 10.24s, a PO is calculated based on a PTW. When the eDRX cycle is less than 10.24s, the PO is calculated by using a conventional method.

Figures 3, 4:
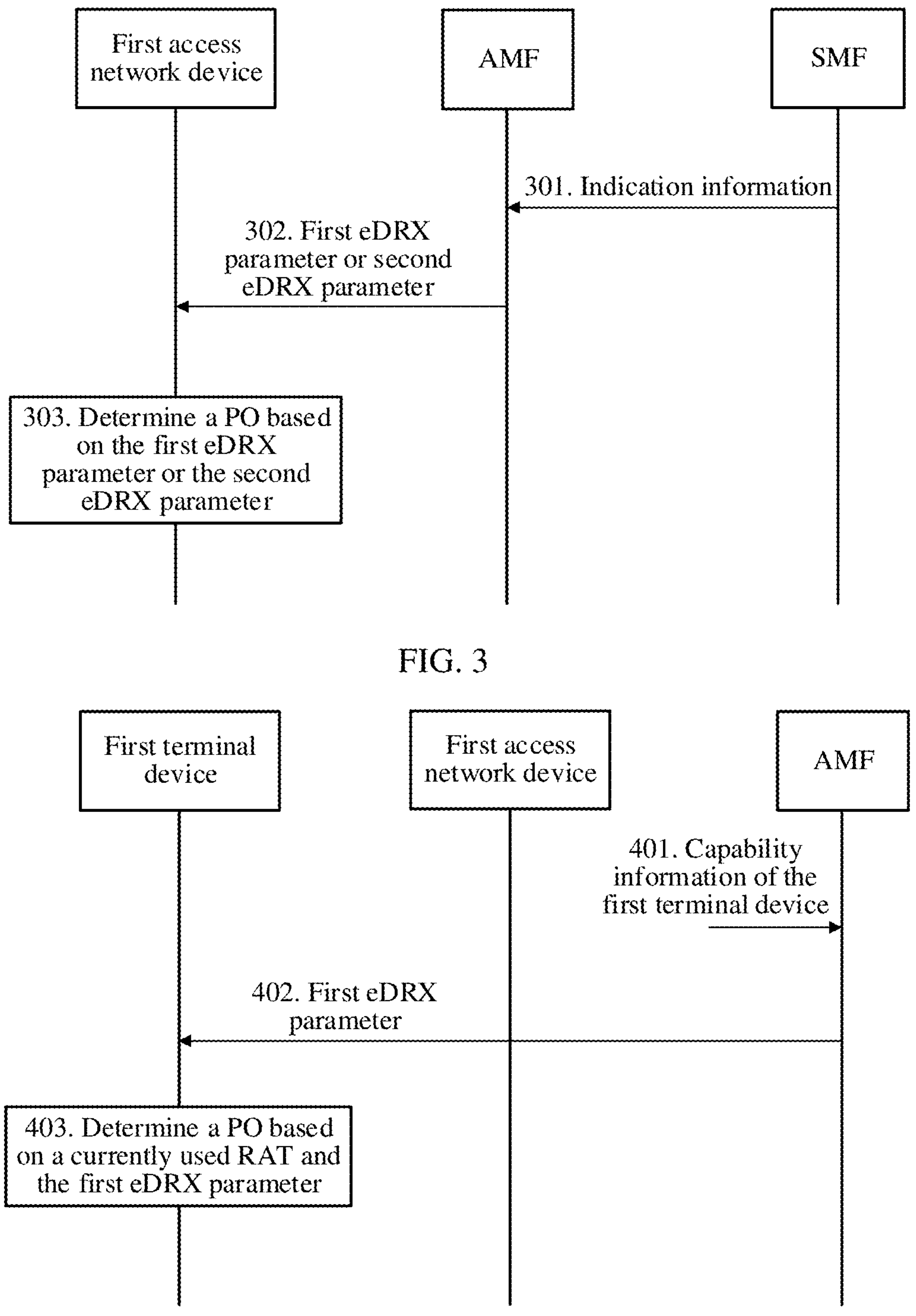
FIG. 3 is a schematic flowchart of a communication method according to an embodiment.
FIG. 4 is a schematic flowchart of another communication method according to an embodiment.

Based on the foregoing network architecture, FIG. 3 is a schematic flowchart of a communication method according to an embodiment. As shown in FIG. 3, the communication method may include the following steps.

301. An SMF network element sends indication information to an AMF network element.

After receiving downlink data from a DN, a UPF network element indicates that there is downlink data to be sent to a first terminal device, and may send a data notification message to the SMF network element, to notify the SMF network element that the downlink data of the first terminal device arrives at the UPF network element. After receiving the data notification message from the UPF network element, the SMF network element may send the indication information to the AMF network element, to indicate that the downlink data of the first terminal device arrives at a core network side, that is, the UPF network element. The downlink data may include or carry an IP address of the first terminal device, indicating that the downlink data is downlink data sent to the first terminal device. The data arrival notification message may include or carry an identifier of the first terminal device, for example, a PDU session identifier or an N4 session identifier, to indicate that the data arrival notification message is a data arrival notification message for the first terminal device. The indication information may include or carry the identifier of the first terminal device, to indicate that the indication information is indication information for the first terminal device.

Correspondingly, the AMF network element receives the indication information from the SMF network element.

302. When an eDRX cycle of the first terminal device is greater than or equal to a first threshold, the AMF network element sends an eDRX parameter to a first access network device based on capability information of the first terminal device and capability information of the first access network device.

After receiving the indication information from the SMF network element, the AMF network element may determine, based on the indication information, that the downlink data of the first terminal device arrives at the core network side, that is, the UPF network element. Then, the AMF network element may first determine whether the eDRX cycle of the first terminal device is greater than or equal to the first threshold. When determining that the eDRX cycle of the first terminal device is greater than or equal to the first threshold, the AMF network element may send the eDRX parameter to the first access network device based on the capability information of the first terminal device and the capability information of the first access network device. The AMF network element may first determine whether the first terminal device is in an idle mode, and when determining that the first terminal device is in the idle mode, may continue to determine whether the eDRX cycle of the first terminal device is greater than or equal to the first threshold. When determining that the eDRX cycle of the first terminal device is greater than or equal to the first threshold, the AMF network element may send the eDRX parameter to the first access network device based on the capability information of the first terminal device and the capability information of the first access network device, that is, sending a paging message to the first access network device, where the paging message may include the eDRX parameter. The first access network device is any access network device in a tracking area (TA) list of the first terminal device.

The capability information of the first terminal device may include type information of a RAT for accessing an access network device, which may also be understood as including type information of a RAT used by the first terminal device to access an access network device, or may be understood as including type information of a RAT supported by the first terminal device. The type information may include information about a first-type RAT and information about a second-type RAT. eDRX corresponding to the first-type RAT supports a PTW, and eDRX corresponding to the second-type RAT does not support a PTW. That eDRX corresponding to the first-type RAT supports a PTW may be understood as: When the eDRX cycle is less than the first threshold, the terminal device and the access network device may calculate a PO by using a conventional method (that is, do not use the PTW). When the eDRX cycle is greater than or equal to the first threshold, the terminal device and the access network device may calculate a PO by using the PTW. That eDRX corresponding to the second-type RAT does not support the PTW may be understood as: Regardless of the eDRX cycle, that is, regardless of whether the eDRX cycle is less than the first threshold or greater than or equal to the first threshold, both the terminal device and the access network device may calculate a PO by using a conventional method, rather than calculate a PO by using the PTW. The first threshold may be 10.24s or another value, and may be set according to a requirement. This is not limited herein.

In one case, the information about the first-type RAT may be a name of the first-type RAT, may be an index number of the first-type RAT, may be an identifier of the first-type RAT, or may be other information that can uniquely identify the first-type RAT. Likewise, the information about the second-type RAT may be a name of the second-type RAT, may be an index number of the second-type RAT, may be an identifier of the second-type RAT, or may be other information that can uniquely identify the second-type RAT. It can be learned that the capability information of the first terminal device may directly include the information about the first-type RAT and the information about the second-type RAT. The AMF network element may directly determine the first-type RAT and the second-type RAT based on the capability information of the first terminal device, that is, determine that the first terminal device supports the first-type RAT and the second-type RAT.

In another case, the information about the first-type RAT may include information about at least one (that is, one or more) RAT belonging to the first-type RAT. The at least one RAT may be all RATs that belong to the first-type RAT and that are supported by the first terminal device, or may be some RATs in all RATs that belong to the first-type RAT and that are supported by the first terminal device. Likewise, the information about the second-type RAT may include information about at least one RAT belonging to the second-type RAT. The at least one RAT may be all RATs that belong to the second-type RAT and that are supported by the first terminal device, or may be some RATs in all RATs that belong to the second-type RAT and that are supported by the first terminal device. It can be learned that the capability information of the first terminal device may include information about a plurality of RATs, in other words, include information about two or more RATs, in other words, include information about at least two RATs. At least one RAT (that is, one or more RATs) in the plurality of RATs belongs to the first-type RAT, and at least one RAT in the plurality of RATs belongs to the second-type RAT. The AMF network element may first determine types of RATs corresponding to the information about the plurality of RATs included in the capability information of the first terminal device, that is, determine types of the plurality of RATs. Then, the AMF network element may collect statistics on the types of the plurality of RATs, including the first-type RAT and the second-type RAT, to determine that the first terminal device supports the first-type RAT and the second-type RAT.

The capability information of the first access network device may include information about a first RAT used by the terminal device to access the first access network device.

That the AMF network element sends the eDRX parameter to the first access network device based on the capability information of the first terminal device and the capability information of the first access network device may be first determining, based on the capability information of the first terminal device, whether the first terminal device supports the first-type RAT and the second-type RAT. When determining that the first terminal device supports the first-type RAT and the second-type RAT, the AMF network element may determine the first RAT based on the information about the first RAT, and then may determine whether the first RAT belongs to the first-type RAT or the second-type RAT. When it is determined that the first RAT belongs to the first-type RAT, it indicates that the first access network device supports the first-type RAT, and the AMF network element may send a first eDRX parameter to the first access network device, that is, send a first paging message to the first access network device, where the first paging message may include the first eDRX parameter. The first eDRX parameter may include a PTW parameter. When it is determined that the first RAT does not belong to the first-type RAT, that is, the first RAT belongs to the second-type RAT, it indicates that the first access network device supports the second-type RAT, and the AMF network element may send a second eDRX parameter to the first access network device, that is, send a second paging message to the first access network device. The second paging message may include the second eDRX parameter. The second eDRX parameter does not include the PTW parameter. Both the first eDRX parameter and the second eDRX parameter may include a length of the eDRX cycle. The PTW parameter may include a length of the PTW. It can be learned that when the first access network device supports the first-type RAT, the AMF network element may send, to the first access network device, an eDRX parameter that carries the PTW parameter; or when the first access network device supports the second-type RAT, the AMF network element may send, to the first access network device, an eDRX parameter that does not carry the PTW parameter.

In conclusion, when the first terminal device in the idle mode has downlink data arriving, the eDRX cycle of the first terminal device is greater than or equal to the first threshold, and the first terminal device supports the first-type RAT and the second-type RAT, the AMF network element may send, based on types of RATs corresponding to all access network devices in a TA area of the first terminal device, different eDRX parameters to an access network device that supports different types of RATs.

Correspondingly, the first access network device receives the eDRX parameter from the AMF network element.

For example, the first-type RAT may include at least one of LTE, LTE-M, NB-IoT, and the like. The second-type RAT may include REDCAP and the like. It should be understood that the foregoing is an example description of the RAT that belongs to the first-type RAT and the second-type RAT, and does not constitute a limitation on a RAT included in the first-type RAT and the second-type RAT.

303. The first access network device determines a PO based on the eDRX parameter.

After receiving the eDRX parameter from the AMF network element, the first access network device may determine the PO based on the eDRX parameter, and then page the first terminal device on the PO. When the first RAT belongs to the first-type RAT, that is, the first access network device supports the first-type RAT, the first access network device receives the first eDRX parameter. The first RAT is a RAT used by the terminal device to access the first access network device. The first access network device may first calculate a PTW based on the PTW parameter included in the first eDRX parameter, and then may calculate the PO based on the PTW. The first access network device may first calculate an SFN. Formulas for calculating the SFN may be as follows:

$$SFN=256*i_{eDRX} \tag{1}$$

$$i_{eDRX}=\lfloor UE\_ID\_H/T_{eDRX\_H}\rfloor \bmod 4 \tag{2}$$

where UE_ID_H is an identifier of the terminal device, $T_{eDRX\_H}$ is the length of the eDRX cycle of the terminal device, $\lfloor\cdot\rfloor$ is rounding down, and mod is a modulo operation. Then, the first access network device may calculate start time of the PTW based on the SFN. A formula for calculating the start time of the PTW may be as follows:

$$SFN=(PTW\_start+L*100-1) \bmod 1024 \tag{3}$$

where PTW_start is the start time of the PTW, and L is a length of the PTW. Then, the PO may be calculated based on the PTW. A formula for calculating the PO may be as follows:

$$i\_H=\lfloor UE\_ID\_H/N\_H\rfloor \bmod Ns \tag{4}$$

where i_H is an index number of the PO, N_H is a quantity of paging frames (PF) included in the PTW, and Ns is a quantity of POs included in one PF.

When the first RAT belongs to the second-type RAT, that is, when the first access network device supports the second-type RAT, the first access network device receives the second eDRX parameter. The first access network device may calculate the PO based on the second eDRX parameter. A formula for calculating the PO may be as follows:

$$i\_s=\lfloor UE\_ID\_H/N\rfloor \bmod Ns \tag{5}$$

where i_s is an index number of the PO, and N is a quantity of PFs included in the eDRX cycle of the terminal device.

Optionally, before receiving the indication information from the SMF network element, the AMF network element may receive the capability information of the first terminal device.

In one case, the first terminal device may determine, based on the supported RAT, whether the first terminal device supports the first-type RAT and the second-type RAT. When determining that the first terminal device supports the first-type RAT and the second-type RAT, the first terminal device may send the capability information of the first terminal device to the AMF network element. Correspondingly, the AMF network element receives the capability information of the first terminal device from the first terminal device. The first terminal device may send the capability information of the first terminal device to the AMF network element in a registration process. For example, the first terminal device may send a registration request message to the AMF network element, where the registration request message may include or carry the capability information of the first terminal device. The first terminal device may alternatively send the capability information of the first terminal device to the AMF network element in another process. This is not limited herein. When determining that the first terminal device supports only the first-type RAT or the second-type RAT, the first terminal device may not send the capability information of the first terminal device to the AMF network element.

In another case, a second access network device may obtain the radio capability information of the first terminal device, and may determine, based on the radio capability information of the first terminal device, whether the first terminal device supports the first-type RAT and the second-type RAT. When determining that the first terminal device supports the first-type RAT and the second-type RAT, the second access network device may send the capability information of the first terminal device to the AMF network element. Correspondingly, the AMF network element receives the capability information of the first terminal device from the second access network device. When determining that the first terminal device supports only the first-type RAT or the second-type RAT, the second access network device may not send the capability information of the first terminal device to the AMF network element. The second access network device is an access network device accessed by the first terminal device when the AMF network element receives the radio capability information of the first terminal device. The radio capability information of the first terminal device may be obtained by the second access network device from the first terminal device. The radio capability information of the first terminal device may be actively sent by the first terminal device to the second access network device. Alternatively, the second access network device may first send an obtaining request to the first terminal device; after receiving the obtaining request, the first terminal device may send the radio capability information to the second access network device based on the obtaining request. Alternatively, the second access network device may obtain the radio capability information of the first terminal device from another device or network element, for example, the AMF network element. This is not limited herein. The foregoing process may be completed in the registration process of the first terminal device. For example, the second access network device may send an N2 message to the AMF network element, where the N2 message may include or carry the capability information of the first terminal device. The foregoing process may alternatively be completed in another process. This is not limited herein. The radio capability information of the first terminal device is information supported by the first terminal device for accessing an access network device, and may include a frequency band, transmit power, and the like.

After receiving the capability information of the first terminal device, the AMF network element may determine, based on the capability information of the first terminal device, that the first terminal device supports the first-type RAT and the second-type RAT, and then may store the capability information of the first terminal device for subsequent invocation. The AMF network element may determine the eDRX cycle of the first terminal device, and then may determine whether the eDRX cycle of the first terminal device is greater than or equal to the first threshold, and may send the first eDRX parameter to the first terminal device based on the capability information of the first terminal device when determining that the eDRX cycle of the first terminal device is greater than or equal to the first threshold. Correspondingly, the first terminal device receives the first eDRX parameter from the AMF network element. It can be learned that, when the first terminal device supports the first-type RAT and the second-type RAT, and the eDRX cycle of the first terminal device is greater than or equal to the first threshold, regardless of whether a RAT currently used by the first terminal device belongs to the first-type RAT, that is, regardless of a type of the RAT currently used by the first terminal device, the AMF network element may send the eDRX parameter including the PTW parameter to the first terminal device. When the foregoing is completed in the registration process, the AMF network element may send a registration accept message to the first terminal device, where the registration accept message may include or carry the first eDRX parameter.

After receiving the first eDRX parameter from the AMF network element, the first terminal device may determine a PO based on the currently used RAT and the first eDRX parameter. The first terminal device may first determine whether the RAT currently used by the first terminal device belongs to the first-type RAT or the second-type RAT, and then may determine a PO calculation manner based on the first-type RAT or the second-type RAT. When the RAT currently used by the first terminal device belongs to the first-type RAT, the first terminal device may first calculate a PTW based on the PTW parameter included in the first eDRX parameter, and then may calculate the PO based on the PTW. When the RAT currently used by the first terminal device belongs to the second-type RAT, the first terminal device does not need to calculate a PTW based on the PTW parameter included in the first eDRX parameter, and may directly calculate the PO. For detailed descriptions, refer to the related descriptions corresponding to the first access network device. It can be learned that when the RAT currently used by the first terminal device belongs to the first-type RAT, the first terminal device first calculates the PTW, and then calculates the PO based on the PTW; or when the RAT currently used by the first terminal device belongs to the second-type RAT, the first terminal device directly calculates the PO by using a conventional method.

It can be learned that the AMF network element may obtain the capability information of the first terminal device in the registration process of the first terminal device, and may determine, based on the capability information of the first terminal device, that the first terminal device supports the first-type RAT and the second-type RAT. In this way, it can be ensured that in a process of negotiating the eDRX parameter of the first terminal device, when the eDRX cycle of the first terminal device is greater than or equal to the first threshold, the AMF network element can directly configure the eDRX parameter including the PTW parameter for the first terminal device regardless of the type of the RAT currently used by the first terminal device. The first terminal device may determine, based on the type of the RAT currently used by the first terminal device, whether to use the PTW parameter in the eDRX parameter.

Based on the foregoing network architecture, FIG. 4 is a schematic flowchart of another communication method according to an embodiment. As shown in FIG. 4, the communication method may include the following steps.

401. An AMF network element receives capability information of a first terminal device.

The AMF network element may receive the capability information from the first terminal device. For detailed descriptions of the capability information of the first terminal device, refer to step 302.

In one case, the first terminal device may determine, based on a supported RAT, whether the first terminal device supports a first-type RAT and a second-type RAT. When determining that the first terminal device supports the first-type RAT and the second-type RAT, the first terminal device may send the capability information of the first terminal device to the AMF network element. Correspondingly, the AMF network element receives the capability information of the first terminal device from the first terminal device. For detailed descriptions, refer to the related descriptions in step 303.

In another case, a second access network device may obtain the radio capability information of the first terminal device, and may determine, based on the radio capability information of the first terminal device, whether the first terminal device supports a first-type RAT and a second-type RAT. When determining that the first terminal device supports the first-type RAT and the second-type RAT, the second access network device may send the capability information of the first terminal device to the AMF network element. Correspondingly, the AMF network element receives the capability information of the first terminal device from the second access network device. For detailed descriptions, refer to the related descriptions in step 303.

402. When an eDRX cycle of the first terminal device is greater than or equal to a first threshold, the AMF network element sends a first eDRX parameter to the first terminal device based on the capability information of the first terminal device.

After receiving the capability information of the first terminal device, when the eDRX cycle of the first terminal device is greater than or equal to the first threshold, the AMF network element may send the first eDRX parameter to the first terminal device based on the capability information of the first terminal device.

After receiving the capability information of the first terminal device, the AMF network element may first determine the eDRX cycle of the first terminal device. Then, the AMF network element may determine whether the eDRX cycle of the first terminal device is greater than or equal to the first threshold, and may send the first eDRX parameter to the first terminal device based on the capability information of the first terminal device when determining that the eDRX cycle of the first terminal device is greater than or equal to the first threshold. The AMF network element may first determine, based on the capability information of the first terminal device, whether the first terminal device supports the first-type RAT and the second-type RAT. When determining that the first terminal device supports both the first-type RAT and the second-type RAT, the AMF network element may send the first eDRX parameter to the first terminal device.

Correspondingly, the first terminal device receives the first eDRX parameter from the AMF network element.

403. The first terminal device determines a PO based on a currently used RAT and the first eDRX parameter.

After receiving the first eDRX parameter from the AMF network element, the first terminal device may determine the PO based on the currently used RAT and the first eDRX parameter. For detailed descriptions, refer to the related descriptions in step 303.

Optionally, after receiving downlink data from a DN, a UPF network element may send a data arrival notification message to an SMF network element. After receiving the data arrival notification message from the UPF network element, the SMF network element may send indication information to the AMF network element. Correspondingly, the AMF network element receives the indication information from the SMF network element. For detailed descriptions, refer to step 301.

After receiving the indication information from the SMF network element, the AMF network element may first determine whether the first terminal device is in an idle mode. When determining that the first terminal device is in the idle mode, the AMF network element may continue to determine whether the eDRX cycle of the first terminal device is greater than or equal to the first threshold and whether the first terminal device supports the first-type RAT and the second-type RAT. When determining that the eDRX cycle of the first terminal device is greater than or equal to the first threshold and the first terminal device supports the first-type RAT and the second-type RAT, the AMF network element may separately send the first eDRX parameter to all access network devices in a TA list, that is, separately send a first paging message to all the access network devices in the TA list. The first paging message may include the first eDRX parameter. It can be learned that the AMF network element may send a same eDRX parameter to different access network devices.

After receiving the first eDRX parameter from the AMF network element, the access network device in the TA list may determine a PO based on capability information of the access network device and the first eDRX parameter. The access network device may first determine, based on the capability information of the access network device, whether the currently used RAT belongs to the first-type RAT or the second-type RAT. Then, the access network device may determine whether the eDRX cycle is greater than or equal to the first threshold. When the eDRX cycle is greater than or equal to the first threshold, the access network device may determine a PO calculation manner based on the first-type RAT or the second-type RAT. When the RAT currently used by the access network device belongs to the first-type RAT, the access network device may first calculate a PTW based on a PTW parameter included in the first eDRX parameter, and then may calculate the PO based on the PTW. When the RAT currently used by the access network device belongs to the second-type RAT, the access network device may directly calculate the PO without calculating a PTW based on a PTW parameter included in the first eDRX parameter. For detailed descriptions, refer to the related descriptions in step 303.

It can be learned that, when the first terminal device in the idle mode has downlink data arriving, the eDRX cycle of the first terminal device is greater than or equal to the first threshold, and the first terminal device supports the first-type RAT and the second-type RAT, the AMF network element may send a same eDRX parameter including the PTW parameter to all the access network devices in the TA area. After receiving the eDRX parameter, the access network device may determine, based on a capability of the access network device, whether to use the PTW parameter in the eDRX parameter.

Figure 5:
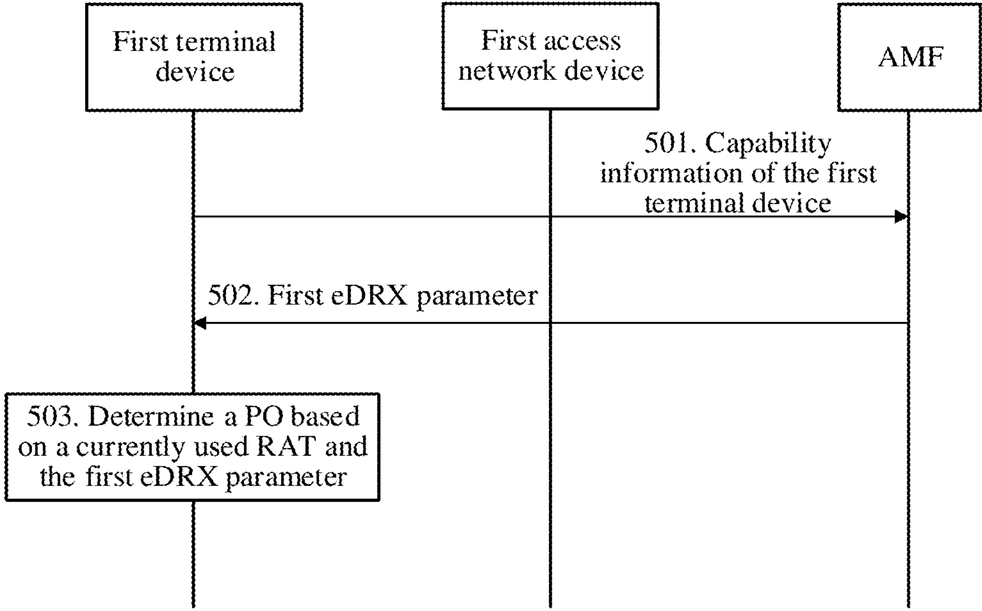
FIG. 5 is a schematic flowchart of still another communication method according to an embodiment.

Based on the foregoing network architecture, FIG. 5 is a schematic flowchart of still another communication method according to an embodiment. As shown in FIG. 5, the communication method may include the following steps.

501. A first terminal device sends capability information of the first terminal device to an AMF network element.

Correspondingly, the AMF network element receives the capability information from the first terminal device.

For detailed descriptions of step 501, refer to the case in step 401.

502. When an eDRX cycle of the first terminal device is greater than or equal to a first threshold, the AMF network element sends a first eDRX parameter to the first terminal device based on the capability information of the first terminal device.

Correspondingly, the first terminal device receives the first eDRX parameter from the AMF network element.

For detailed descriptions of step 502, refer to step 402.

503. The first terminal device determines a PO based on a currently used RAT and the first eDRX parameter.

For detailed descriptions of step 503, refer to step 403.

Figure 6:
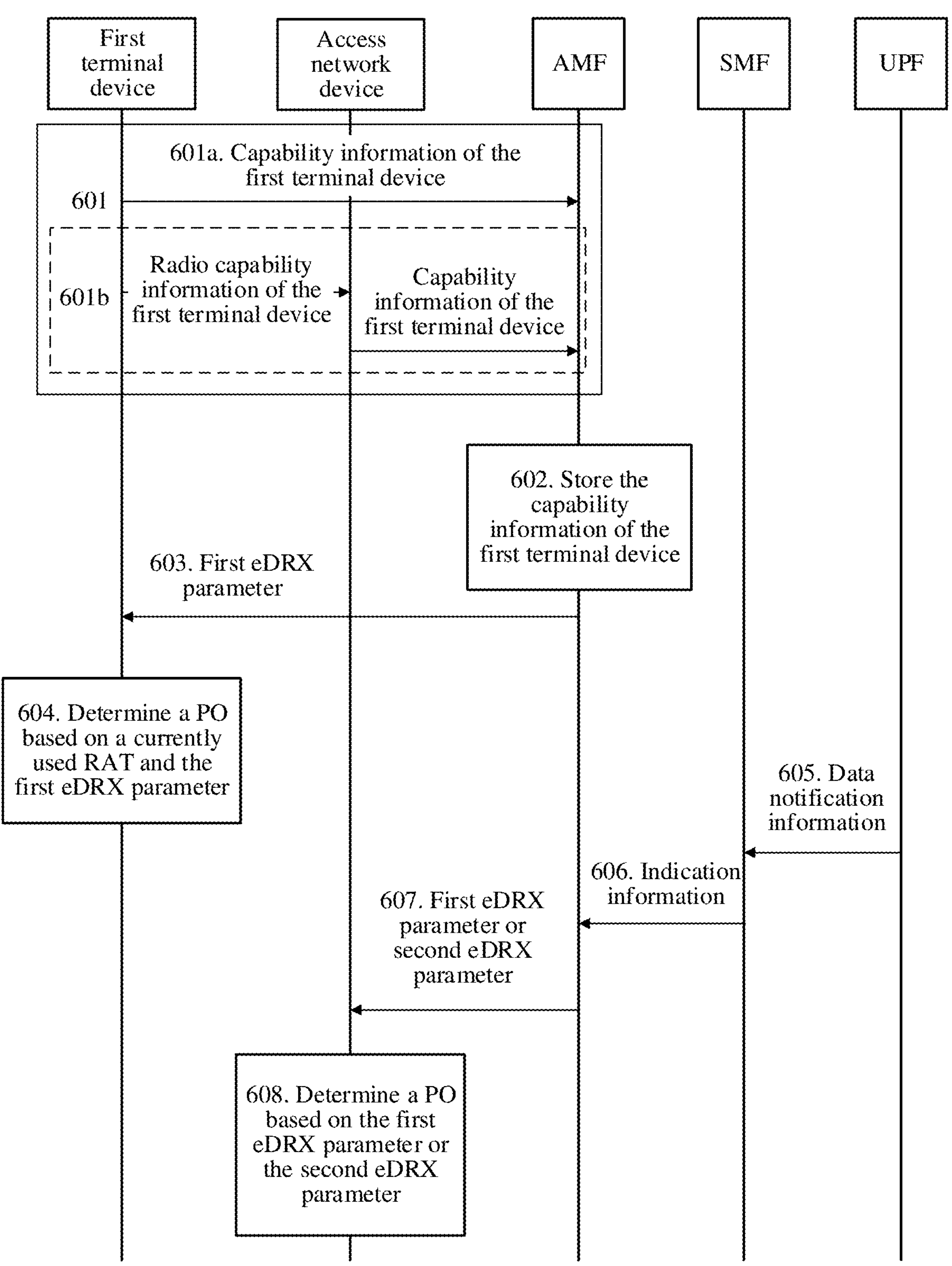
FIG. 6 is a schematic flowchart of still another communication method according to an embodiment.

Based on the foregoing network architecture, FIG. 6 is a schematic flowchart of still another communication method according to an embodiment. As shown in FIG. 6, the communication method may include the following steps.

601. An AMF network element receives capability information of a first terminal device.

In one case, in 601*a*, when the first terminal device supports a first-type RAT and a second-type RAT, the capability information of the first terminal device is sent to the AMF network element. In another case, in 601*b*, when the first terminal device supports a first-type RAT and a second-type RAT, an access network device may send the capability information of the first terminal device to the AMF network element.

For detailed descriptions of step 601, refer to the descriptions of step 401.

602. The AMF network element stores the capability information of the first terminal device.

After receiving the capability information from the first terminal device, the AMF network element may store the capability information of the first terminal device for subsequent invocation.

603. When an eDRX cycle of the first terminal device is greater than or equal to a first threshold, the AMF network element sends a first eDRX parameter to the first terminal device based on the capability information of the first terminal device.

For detailed descriptions of step 603, refer to step 402.

604. The first terminal device determines a PO based on a currently used RAT and the first eDRX parameter.

For detailed descriptions of step 604, refer to step 403.

605. A UPF network element sends a data notification message to an SMF network element.

For detailed descriptions of step 605, refer to step 301.

606. The SMF network element sends indication information to the AMF network element.

For detailed descriptions of step 606, refer to step 301.

607. When the eDRX cycle of the first terminal device is greater than or equal to the first threshold, the AMF network element sends an eDRX parameter to a first access network device based on capability information of the first terminal device and capability information of the first access network device.

For detailed descriptions of step 607, refer to step 302.

608. The access network device determines a PO based on the eDRX parameter.

For detailed descriptions of step 608, refer to step 303.

Figure 7:
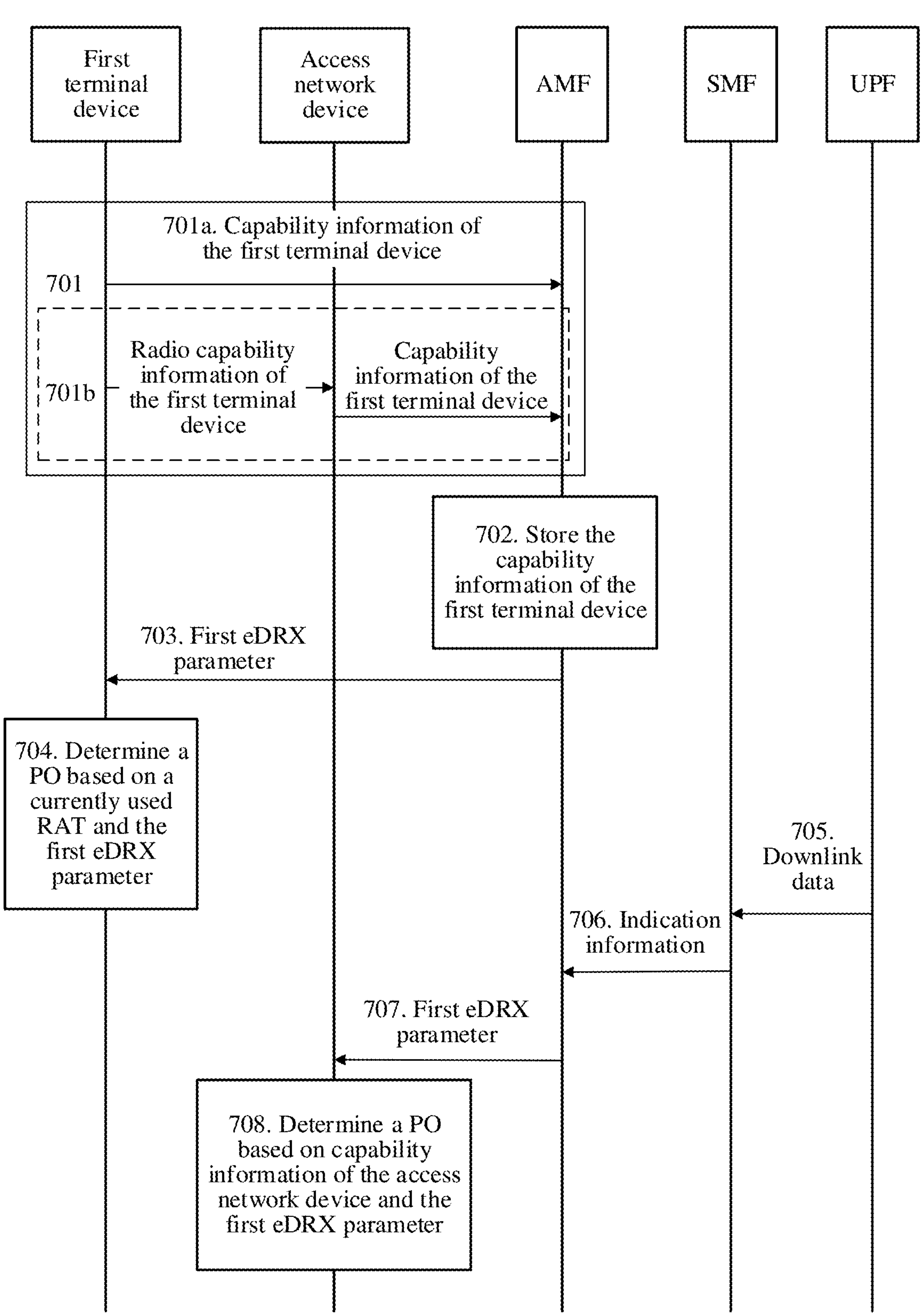
FIG. 7 is a schematic flowchart of still another communication method according to an embodiment.

Based on the foregoing network architecture, FIG. 7 is a schematic flowchart of still another communication method according to an embodiment. As shown in FIG. 7, the communication method may include the following steps.

701. An AMF network element receives capability information of a first terminal device.

In one case, in 701*a*, when the first terminal device supports a first-type RAT and a second-type RAT, the capability information of the first terminal device is sent to the AMF network element. In another case, in 701*b*, when the first terminal device supports a first-type RAT and a second-type RAT, an access network device may send the capability information of the first terminal device to the AMF network element.

For detailed descriptions of step 701, refer to the descriptions of step 401.

702. The AMF network element stores the capability information of the first terminal device.

After receiving the capability information from the first terminal device, the AMF network element may store the capability information of the first terminal device for subsequent invocation.

703. When an eDRX cycle of the first terminal device is greater than or equal to a first threshold, the AMF network element sends a first eDRX parameter to the first terminal device based on the capability information of the first terminal device.

For detailed descriptions of step 703, refer to step 402.

704. The first terminal device determines a PO based on a currently used RAT and the first eDRX parameter.

For detailed descriptions of step 704, refer to step 403.

705. A UPF network element sends a data notification message to an SMF network element.

For detailed descriptions of step 705, refer to step 301.

706. The SMF network element sends indication information to the AMF network element.

For detailed descriptions of step 706, refer to step 301.

707. The AMF network element separately sends the first eDRX parameter to all access network devices in a tracking area TA list corresponding to the first terminal device.

For detailed descriptions of step 707, refer to the related descriptions of step 403.

708. The access network device determines a PO based on capability information of the access network device and the first eDRX parameter.

For detailed descriptions of step 708, refer to the related descriptions of step 403.

Figure 8:
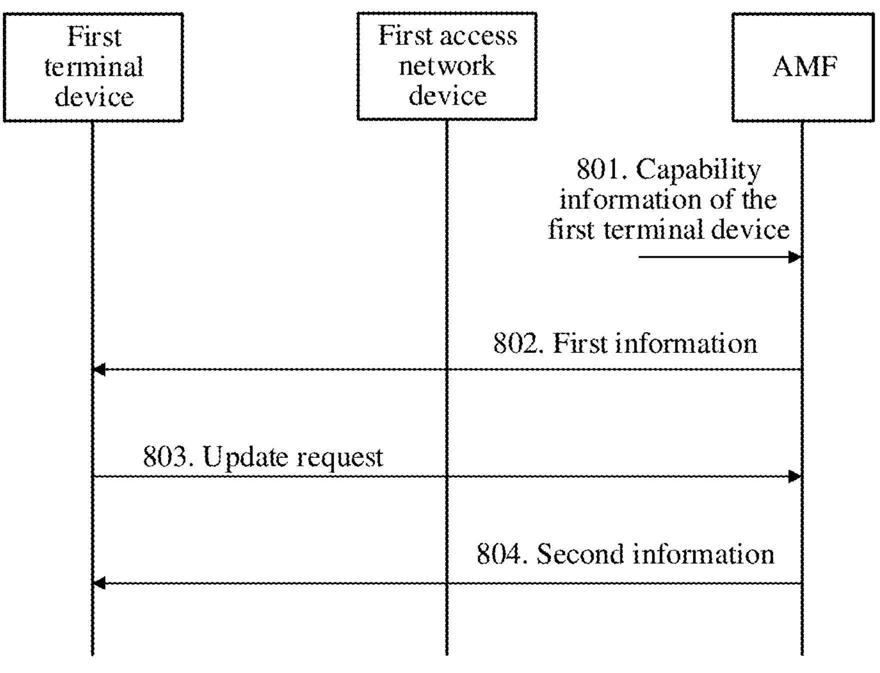
FIG. 8 is a schematic flowchart of still another communication method according to an embodiment.

Based on the foregoing network architecture, FIG. 8 is a schematic flowchart of still another communication method according to an embodiment. As shown in FIG. 8, the communication method may include the following steps.

801. An AMF network element receives capability information of a first terminal device.

For detailed descriptions of step 801, refer to the descriptions of step 401. For detailed descriptions of the capability information of the first terminal device, refer to step 302.

802. The AMF network element sends first information to the first terminal device.

After receiving the capability information of the first terminal device, the AMF network element may determine, based on the capability information of the first terminal device, that the first terminal device supports a first-type RAT and a second-type RAT. For detailed descriptions, refer to the related descriptions in step 302.

In one case, when determining that the first terminal device supports the first-type RAT and the second-type RAT, the AMF network element may directly determine the first information, and may send the first information to the first terminal device. In another case, when determining that the first terminal device supports the first-type RAT and the second-type RAT, the AMF network element may first determine whether the eDRX cycle of the first terminal device is greater than or equal to the first threshold, and when determining that the eDRX cycle of the first terminal device is greater than or equal to the first threshold, may determine the first information and send the first information to the first terminal device.

The first information may include information about a first TA list, the first TA list may include of a RAT in the first-type RAT, and a TA list of the first terminal device may include the first TA list. That the RAT used by the first terminal device to access the access network device may be understood as a RAT currently used by the first terminal device to access the access network device, may be understood as a RAT that can be used by the first terminal device to access the access network device, or may be understood as a RAT supported by the first terminal device. The first TA list includes of a cell (or an area) corresponding to the RAT in the first-type RAT, which may be understood as that the first TA list includes a cell (or an area) corresponding to a RAT that belongs to the first-type RAT and that is in all RATs supported by the first terminal device, or may include cells (or areas) corresponding to all RATs that belong to the first-type RAT. All the RATs that belong to the first-type RAT may include a RAT that belongs to the first-type RAT in all RATs supported by the first terminal device. When the first TA list includes of the cell (or the area) corresponding to the RAT that belongs to the first-type RAT in all the RATs supported by the first terminal device, when the capability information of the first terminal device includes information about all the RATs supported by the first terminal device, the first terminal device does not need to additionally send information about a RAT in the first TA list to the AMF network element. When the information about the first terminal device does not include information about all the RATs supported by the first terminal device, the first terminal device further needs to send, to the AMF network element, information about a RAT that is supported by the first terminal device and that belongs to the first-type RAT. It should be understood that a RAT currently used by the first terminal device belongs to the first-type RAT. It can be learned that the first terminal device needs to send, to the AMF network element, the information about all RATs that are supported by the first terminal device and that are of a same type as the currently used RAT. The information about the RATs may be included in the capability information of the first terminal device, may be sent to the AMF network element together with the capability information of the first terminal device, or may be sent to the AMF network element in another manner.

The AMF network element may first determine that the RAT currently used by the first terminal device belongs to the first-type RAT, and then may determine the first information based on all the RATs that are supported by the first terminal device and that belong to the first-type RAT, or may determine the first information based on all the RATs that belong to the first-type RAT. The first terminal device may send the information about the RAT currently used by the first terminal device to the AMF network element, so that the AMF network element can determine, based on the information about the RAT currently used by the first terminal device, that the RAT currently used by the first terminal device belongs to the first-type RAT.

In addition, the AMF network element may further determine a third eDRX parameter. The third eDRX parameter may include a PTW parameter. The AMF may send the first information and the third eDRX parameter to the first terminal device.

The AMF network element may send a registration completion message to the first terminal device. The registration completion message may include the first information (and the third eDRX parameter).

Correspondingly, the first terminal device receives the first information (and the third eDRX parameter) from the AMF network element.

803. When the first terminal device moves out of an area corresponding to the first TA list, the first terminal device sends a mobility registration update request to the AMF network element.

After the first terminal device receives the first information from the AMF network element, when the first terminal device is in an idle mode, and the RAT used by the first terminal device to attach (or camp on) a cell/an access network device changes, the first terminal device may determine whether a changed RAT belongs to the first TA list. When it is determined that the changed RAT does not belong to the first TA list, it indicates that the first terminal device moves out of the area corresponding to the first TA list, and the first terminal device sends the mobility registration update request to the AMF network element. The mobile registration update request may indicate that the first terminal device moves out of the area corresponding to the first TA list. When it is determined that the changed RAT belongs to the first TA list, it indicates that the first terminal device does not move out of the area corresponding to the first TA list, and the first terminal device may not send the mobility registration update request to the AMF network element.

Correspondingly, the AMF network element receives the mobility registration update request from the first terminal device.

804. The AMF network element sends second information to the first terminal device.

After receiving the mobility registration update request from the first terminal device, the AMF network element may determine the second information, and may send the second information to the first terminal device. The second information may include information about a second TA list. The second TA list may include of a cell (or an area) corresponding to a RAT in the second-type RAT. The TA list of the first terminal device may include the second TA list. In this case, the RAT currently used by the first terminal device belongs to the second-type RAT. For detailed descriptions of the second TA list, refer to the related descriptions of the first TA list.

The first terminal device may further send, to the AMF network element, information about all RATs that are supported by the first terminal device and that belong to the second-type RAT. In other words, the first terminal device further needs to send, to the AMF network element, information about all RATs that are supported by the first terminal device and that are of a same type as the currently used RAT. The information about the RATs may be included in the capability information of the first terminal device, may be sent to the AMF network element together with the capability information of the first terminal device, may be included in the mobility registration update request, or may be sent to the AMF network element in another manner.

In addition, the AMF network element may further determine a fourth eDRX parameter. The fourth eDRX parameter does not include the PTW parameter. The AMF network element may send the second information and the fourth eDRX parameter to the first terminal device. The AMF network element may send the second information and the fourth eDRX parameter to the first terminal device by using a registration accept message.

Correspondingly, the first terminal device receives the second information (and the fourth eDRX parameter) from the AMF network element.

It should be understood that the foregoing descriptions are provided by using an example in which the RAT used by the first terminal device during registration belongs to the first-type RAT. This is also applicable to a case in which the RAT used by the first terminal device during registration belongs to the second-type RAT. In this case, in a registration process (that is, step 802), the AMF network element sends the second information (and the fourth eDRX parameter) to the first terminal device. In a mobility update registration process (that is, step 804), the AMF network element sends the first information (and the third eDRX parameter) to the first terminal device.

It can be learned that, to avoid a conflict of an eDRX parameter supported by the terminal device in an idle mode due to cell reselection of the terminal device, whether the terminal device supports a multi-type RAT capability and the eDRX cycle of the terminal device are considered during TA list configuration. Different TA lists are allocated to the terminal device in different types of RATs, to ensure that the mobility update registration procedure is triggered when the terminal device in the idle mode performs cross-RAT cell reselection. In this way, a core network can sense a change of the RAT used by the terminal device, and configure an eDRX parameter of a corresponding RAT type for the terminal device.

It should be understood that, in the foregoing communication method, a function performed by the UPF network element may also be performed by a module (for example, a chip) in the UPF network element, a function performed by the AMF network element may also be performed by a module (for example, a chip) in the AMF network element, a function performed by the SMF network element may also be performed by a module (for example, a chip) in the SMF network element, and a function performed by the access network device may also be performed by a module (for example, a chip) in the access network device, and a function performed by the first terminal device may also be performed by a module (for example, a chip) in the first terminal device.

It should be understood that related information (that is, same information or similar information) in the foregoing different embodiments may be mutually referenced.

Figure 9:
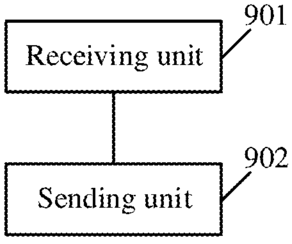
FIG. 9 is a schematic diagram of a structure of a communication apparatus according to an embodiment.

Based on the foregoing network architecture, FIG. 9 is a schematic diagram of a structure of a communication apparatus according to an embodiment. As shown in FIG. 9, the communication apparatus may include a receiving unit 901 and a sending unit 902.

In one case, the communication apparatus may be an AMF network element, or may be a module (for example, a chip) in the AMF network element.

The receiving unit 901 is configured to receive indication information from an SMF network element, where the indication information indicates that downlink data of a first terminal device arrives at a core network side.

The sending unit 902 is configured to: when an eDRX cycle of the first terminal device is greater than or equal to a first threshold, send an eDRX parameter to a first access network device based on capability information of the first terminal device and capability information of the first access network device, where the first access network device is any access network device in a TA list of the first terminal device.

In an embodiment, the capability information of the first terminal device includes type information of a RAT for accessing an access network device, the capability information of the first access network device includes information about a first RAT used by a terminal device to access the first access network device, the type information includes information about a first-type RAT and information about a second-type RAT, eDRX corresponding to the first-type RAT supports a PTW, and eDRX corresponding to the second-type RAT does not support a PTW.

The sending unit 902 is configured to:

- when the first RAT belongs to the first-type RAT, send a first eDRX parameter to the first access network device, where the first eDRX parameter includes a PTW parameter; and
- when the first RAT belongs to the second-type RAT, send a second eDRX parameter to the first access network device, where the second eDRX parameter does not include the PTW parameter.

In an embodiment, the receiving unit 901 is further configured to receive the capability information of the first terminal device.

The sending unit 902 is further configured to: when an eDRX cycle of the first terminal device is greater than or equal to a first threshold, send a first eDRX parameter to the first terminal device based on the capability information of the first terminal device.

In an embodiment, that the receiving unit 901 receives the capability information of the first terminal device includes:

- receiving the capability information of the first terminal device from the first terminal device.

In an embodiment, that the receiving unit 901 receives the capability information of the first terminal device includes:

- receiving the capability information of the first terminal device from a second access network device, where the second access network device is an access network device accessed by the first terminal device when the capability information of the first terminal device is received.

For more detailed descriptions of the receiving unit 901 and the sending unit 902, directly refer to the related descriptions of the AMF network element in the method embodiment shown in FIG. 3. Details are not described herein again.

In another case, the communication apparatus may be an AMF network element, or may be a module (for example, a chip) in the AMF network element.

The receiving unit 901 is configured to receive capability information of a first terminal device, where the capability information of the first terminal device includes type information of a RAT for accessing an access network device, the type information includes information about a first-type RAT and information about a second-type RAT, eDRX corresponding to the first-type RAT supports a PTW, and eDRX corresponding to the second-type RAT does not support a PTW.

The sending unit 902 is configured to: when an eDRX cycle of the first terminal device is greater than or equal to a first threshold, send a first eDRX parameter to the first terminal device based on the capability information of the first terminal device, where the first eDRX parameter includes a PTW parameter.

In an embodiment, the receiving unit 901 is configured to receive the capability information of the first terminal device from the first terminal device.

In an embodiment, the receiving unit 901 is configured to receive the capability information of the first terminal device from a second access network device, where the second access network device is an access network device accessed by the first terminal device when the capability information of the first terminal device is received.

In an embodiment, the receiving unit 901 is further configured to receive indication information from an SMF network element, where the indication information indicates that downlink data of a first terminal device arrives at a core network side.

The sending unit 902 is further configured to separately send the first eDRX parameter to all access network devices in a TA list corresponding to the first terminal device.

For more detailed descriptions of the receiving unit 901 and the sending unit 902, directly refer to the related descriptions of the AMF network element in the method embodiment shown in FIG. 4. Details are not described herein again.

In still another case, the communication apparatus may be an AMF network element, or may be a module (for example, a chip) in the AMF network element.

The receiving unit 901 is configured to receive capability information of a first terminal device, where the capability information of the first terminal device includes type information of a RAT for accessing an access network device, the type information includes information about a first-type RAT and information about a second-type RAT, eDRX corresponding to the first-type RAT supports a PTW, and eDRX corresponding to the second-type RAT does not support a PTW.

The sending unit 902 is configured to send first information to the first terminal device, where the first information includes information about a first TA list, the first TA list includes of a cell corresponding to a RAT in the first-type RAT, and a TA list of the first terminal device includes the first TA list.

In an embodiment, the sending unit 902 is configured to: when an eDRX cycle of the first terminal device is greater than or equal to a first threshold, send the first information to the first terminal device.

In an embodiment, the receiving unit 901 is configured to receive the capability information of the first terminal device from the first terminal device.

In an embodiment, the receiving unit 901 is configured to receive the capability information of the first terminal device from a second access network device, where the second access network device is an access network device accessed by the first terminal device when the capability information of the first terminal device is received.

In an embodiment, that the sending unit 902 sends first information to the first terminal device includes:

- sending the first information and a third eDRX parameter to the first terminal device.

The receiving unit 901 is further configured to receive a mobility registration update request from the first terminal device, where the mobility registration update request indicates that the first terminal device moves out of an area corresponding to the first TA list.

The sending unit 902 is further configured to send second information and a fourth eDRX parameter to the first terminal device, where the second information includes information about a second TA list, the second TA list includes of a cell corresponding to a RAT in the second-type RAT, and the TA list of the first terminal device includes the second TA list.

When the third eDRX parameter includes a PTW parameter, the fourth eDRX parameter does not include the PTW parameter; or when the third eDRX parameter does not include a PTW parameter, the fourth eDRX parameter includes the PTW parameter.

For more detailed descriptions of the receiving unit 901 and the sending unit 902, directly refer to the related descriptions of the AMF network element in the method embodiment shown in FIG. 8. Details are not described herein again.

In still another case, the communication apparatus may be a first terminal device, or may be a module (for example, a chip) in the first terminal device.

The sending unit 902 is configured to send capability information of the first terminal device to an AMF network element, where the capability information of the first terminal device includes type information of a RAT for accessing an access network device, the type information includes information about a first-type RAT and information about a second-type RAT, eDRX corresponding to the first-type RAT supports a PTW, and eDRX corresponding to the second-type RAT does not support a PTW.

The receiving unit 901 configured to receive first information from the AMF network element, where the first information includes information about a first TA list, the first TA list includes of a cell corresponding to a RAT in the first-type RAT, and a TA list of the first terminal device includes the first TA list.

In an embodiment, the sending unit 902 is configured to send the radio capability information of the first terminal device to a second access network device, where the second access network device is an access network device accessed by the first terminal device when the radio capability information of the first terminal device is sent.

In an embodiment, the receiving unit 901 is configured to receive the first information and a third eDRX parameter from the AMF network element.

The sending unit 902 is further configured to: when the first terminal device moves out of an area corresponding to the first TA list, send a mobility registration update request to the AMF network element, where the mobility registration update request indicates that the first terminal device moves out of the area corresponding to the first TA list.

The receiving unit 901 is further configured to receive second information and a fourth eDRX parameter from the AMF network element, where the second information includes information about a second TA list, the second TA list includes of a cell corresponding to a RAT in the second-type RAT, and the TA list of the first terminal device includes the second TA list.

When the third eDRX parameter includes a PTW parameter, the fourth eDRX parameter does not include the PTW parameter; or when the third eDRX parameter does not include a PTW parameter, the fourth eDRX parameter includes the PTW parameter.

For more detailed descriptions of the receiving unit 901 and the sending unit 902, directly refer to the related descriptions of the first terminal device in the method embodiment shown in FIG. 8. Details are not described herein again.

Figure 10:
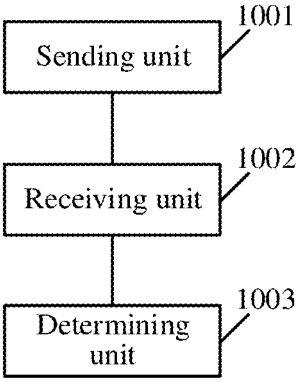
FIG. 10 is a schematic diagram of a structure of another communication apparatus according to an embodiment.

Based on the foregoing network architecture, FIG. 10 is a schematic diagram of a structure of another communication apparatus according to an embodiment. As shown in FIG. 10, the communication apparatus may include:

- a sending unit 1001, configured to send capability information of the first terminal device to an AMF network element, where the capability information of the first terminal device includes type information of a RAT for accessing an access network device, the type information includes information about a first-type RAT and information about a second-type RAT, eDRX corresponding to the first-type RAT supports a PTW, and eDRX corresponding to the second-type RAT does not support a PTW;
- a receiving unit 1002, configured to receive a first eDRX parameter from the AMF network element, where the first eDRX parameter includes a PTW parameter; and
- a determining unit 1003, configured to: when a current RAT corresponding to the first terminal device belongs to the first-type RAT, and an eDRX cycle of the first terminal device is greater than or equal to a first threshold, determine a PO based on the first eDRX parameter.

In an embodiment, the determining unit 1003 is further configured to: when the current RAT corresponding to the first terminal device belongs to the first-type RAT, but the eDRX cycle of the first terminal device is less than the first threshold, or when the current RAT corresponding to the first terminal device belongs to the second-type RAT, determine the PO based on a parameter in the first eDRX parameter other than the PTW parameter.

For more detailed descriptions of the sending unit 1001, the receiving unit 1002, and the determining unit 1003, directly refer to the related descriptions of the first terminal device in the method embodiment shown in FIG. 5. Details are not described herein again.

Figure 11:
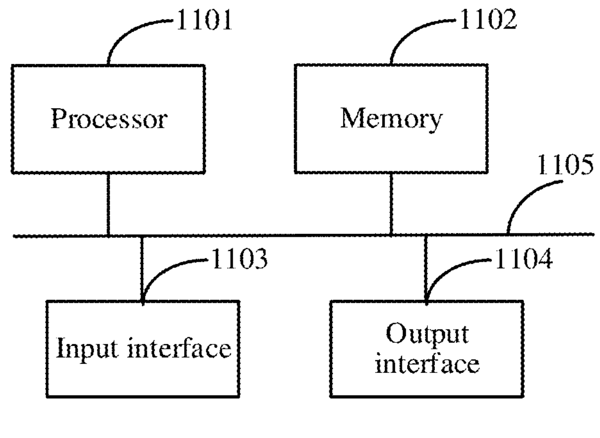
FIG. 11 is a schematic diagram of a structure of still another communication apparatus according to an embodiment.

Based on the foregoing network architecture, FIG. 11 is a schematic diagram of a structure of still another communication apparatus according to an embodiment. As shown in FIG. 11, the communication apparatus may include a processor 1101, a memory 1102, an input interface 1103, an output interface 1104, and a bus 1105. The memory 1102 may exist independently, and may be connected to the processor 1101 by using the bus 1105. Alternatively, the memory 1102 may be integrated with the processor 1101. The bus 1105 is configured to implement connection between these components.

In an embodiment, the communication apparatus may be an AMF network element or a module (for example, a chip) in the AMF network element. When computer program instructions stored in the memory 1102 are executed, the processor 1101 is configured to control the receiving unit 901 and the sending unit 902 to perform the operations performed in the foregoing embodiments. The input interface 1103 is configured to perform the operations performed by the receiving unit 901 in the foregoing embodiments. The output interface 1104 is configured to perform the operations performed by the sending unit 902 in the foregoing embodiments. The AMF network element or the module in the AMF network element may be further configured to perform the methods performed by the AMF network element in the method embodiments in FIG. 3, FIG. 4, and FIG. 8. Details are not described again.

In an embodiment, the communication apparatus may be a first terminal device or a module (for example, a chip) in the first terminal device. When computer program instructions stored in the memory 1102 are executed, the processor 1101 is configured to control the receiving unit 901 and the sending unit 902 to perform the operations performed in the foregoing embodiments. The input interface 1103 is configured to perform the operations performed by the receiving unit 901 in the foregoing embodiments. The output interface 1104 is configured to perform the operations performed by the sending unit 902 in the foregoing embodiments. The first terminal device or the module in the first terminal device may be further configured to perform various methods performed by the first terminal device in the method embodiment in FIG. 8. Details are not described again.

In an embodiment, the communication apparatus may be a first terminal device or a module (for example, a chip) in the first terminal device. When computer program instructions stored in the memory 1102 are executed, the processor 1101 is configured to control the sending unit 1001 and the receiving unit 1002 to perform the operations performed in the foregoing embodiment. The processor 1101 is further configured to perform the operations performed by the determining unit 1103 in the foregoing embodiment. The input interface 1103 is configured to perform the operations performed by the receiving unit 1002 in the foregoing embodiment. The output interface 1104 is configured to perform the operations performed by the sending unit 1001 in the foregoing embodiment. The first terminal device or the module in the first terminal device may be further configured to perform various methods performed by the first terminal device in the method embodiment in FIG. 5. Details are not described again.

Figure 12:
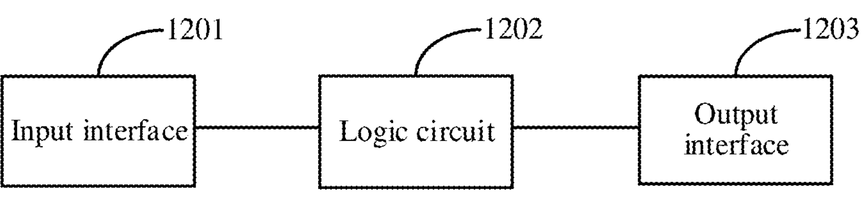
FIG. 12 is a schematic diagram of a structure of still another communication apparatus according to an embodiment.

Based on the foregoing network architecture, FIG. 12 is a schematic diagram of a structure of still another communication apparatus according to an embodiment. As shown in FIG. 12, the communication apparatus may include an input interface 1201, a logic circuit 1202, and an output interface 1203. The input interface 1201 is connected to the output interface 1203 by using the logic circuit 1202. The input interface 1201 is configured to receive information from another communication apparatus. The output interface 1203 is configured to output, schedule, or send information to another communication apparatus. The logic circuit 1202 is configured to perform operations other than operations of the input interface 1201 and the output interface 1203, for example, implement functions implemented by the processor 1101 in the foregoing embodiment. The communication apparatus may be an AMF network element or a module in the AMF network element, or may be a first terminal device or a module in the first terminal device. For more detailed descriptions of the input interface 1201, the logic circuit 1202, and the output interface 1203, directly refer to the related descriptions of the AMF network element or the first terminal device in the foregoing method embodiments. Details are not described herein again.

One or more embodiments involve and/or include a computer-readable storage medium. The computer-readable storage medium stores instructions. When the instructions are executed, the methods in the foregoing method embodiments are performed.

One or more embodiments involve and/or include a computer program product including instructions. When the instructions are executed, the methods in the foregoing method embodiments are performed.

One or more embodiments involve and/or include a communication system. The communication system may include an AMF network element and the like. For specific descriptions, refer to the communication methods shown in FIG. 3 to FIG. 8.

In the foregoing specific implementations, the objectives, technical solutions, and beneficial effects of this application are further described in detail. It should be understood that the foregoing descriptions are merely specific implementations of this application, but are not intended to limit the protection scope of this application. Any modification, equivalent replacement, improvement, or the like made based on the technical solutions of this application shall fall within the protection scope of this application.

What is claimed is:

1. A communication method, comprising:

receiving indication information from a session management function (SMF) network element, wherein the indication information indicates that downlink data of a first terminal device arrives at a core network side; and in response to an extended discontinuous reception (eDRX) cycle of the first terminal device being greater than or equal to a first threshold, sending an eDRX parameter to a first access network device based on capability information of the first terminal device and capability information of the first access network device, wherein the first access network device is any access network device in a tracking area (TA) list of the first terminal device.

2. The communication method according to claim 1, wherein the capability information of the first terminal device comprises type information of a radio access technology (RAT) for accessing an access network device, the capability information of the first access network device comprises information about a first RAT used by a terminal device to access the first access network device, the type information comprises one or more of information about a first-type RAT or information about a second-type RAT, an eDRX corresponding to the first-type RAT supports a paging time window (PTW), and an eDRX corresponding to the second-type RAT does not support a PTW; and the sending the eDRX parameter to the first access network device based on the capability information of the first terminal device and the capability information of the first access network device comprises:

in response to the first RAT belonging to the first-type RAT, sending a first eDRX parameter to the first access network device, wherein the first eDRX parameter comprises a PTW parameter; and in response to the first RAT belonging to the second-type RAT, sending a second eDRX parameter to the first access network device, wherein the second eDRX parameter does not comprise the PTW parameter.

3. The communication method according to claim 2, further comprising:

receiving the capability information of the first terminal device; and in response to the eDRX cycle of the first terminal device being greater than or equal to the first threshold, sending the first eDRX parameter to the first terminal device based on the capability information of the first terminal device.

4. The communication method according to claim 3, wherein the receiving the capability information of the first terminal device comprises:

receiving the capability information of the first terminal device from the first terminal device.

5. The communication method according to claim 3, wherein the receiving the capability information of the first terminal device comprises:

receiving the capability information of the first terminal device from a second access network device, wherein the second access network device is accessed by the first terminal device in response to the capability information of the first terminal device being received.

6. The communication method according to claim 1, further comprising:

causing the SMF network element to send the indication information.

7. The communication method according to claim 1, further comprising:

receiving, by the first access network device, the eDRX parameter.

8. A communication apparatus, comprising:

a processor; and a memory having instructions stored thereon that, when executed by the processor, cause the communication apparatus to:

receive indication information from a session management function (SMF) network element, wherein the indication information indicates that downlink data of a first terminal device arrives at a core network side; and in response to an extended discontinuous reception (eDRX) cycle of the first terminal device being greater than or equal to a first threshold, send an eDRX parameter to a first access network device based on capability information of the first terminal device and capability information of the first access network device, wherein the first access network device is any access network device in a tracking area (TA) list of the first terminal device.

9. The communication apparatus according to claim 8, wherein the capability information of the first terminal device comprises type information of a radio access technology (RAT) for accessing an access network device, the capability information of the first access network device comprises information about a first RAT used by a terminal device to access the first access network device, the type information comprises one or more of information about a first-type RAT or information about a second-type RAT, an eDRX corresponding to the first-type RAT supports a paging time window (PTW), and an eDRX corresponding to the second-type RAT does not support a PTW; and the communication apparatus is further caused to:

in response to the first RAT belonging to the first-type RAT, send a first eDRX parameter to the first access network device, wherein the first eDRX parameter comprises a PTW parameter; and in response to the first RAT belonging to the second-type RAT, sending a second eDRX parameter to the first access network device, wherein the second eDRX parameter does not comprise the PTW parameter.

10. The communication apparatus according to claim 9, wherein the communication apparatus is further caused to:

receive the capability information of the first terminal device; and in response to the eDRX cycle of the first terminal device being greater than or equal to the first threshold, send the first eDRX parameter to the first terminal device based on the capability information of the first terminal device.

11. The communication apparatus according to claim 10, wherein the communication apparatus is further caused to:

receive the capability information of the first terminal device from the first terminal device.

12. The communication apparatus according to claim 10, wherein the communication apparatus is further caused to:

receive the capability information of the first terminal device from a second access network device, wherein the second access network device is accessed by the first terminal device in response to the capability information of the first terminal device being received.

13. The communication apparatus according to claim 8, wherein the communication apparatus is further caused to:

cause the SMF network element to send the indication information.

14. A non-transitory computer readable medium having instructions stored thereon that, when executed by a processor, cause a communication apparatus to:

receive indication information from a session management function (SMF) network element, wherein the indication information indicates that downlink data of a first terminal device arrives at a core network side; and in response to an extended discontinuous reception (eDRX) cycle of the first terminal device being greater than or equal to a first threshold, send an eDRX parameter to a first access network device based on capability information of the first terminal device and capability information of the first access network device, wherein the first access network device is any access network device in a tracking area (TA) list of the first terminal device.

15. The non-transitory computer readable medium according to claim 14, wherein the capability information of the first terminal device comprises type information of a radio access technology (RAT) for accessing an access network device, the capability information of the first access network device comprises information about a first RAT used by a terminal device to access the first access network device, the type information comprises one or more of information about a first-type RAT or information about a second-type RAT, an eDRX corresponding to the first-type RAT supports a paging time window (PTW), and an eDRX corresponding to the second-type RAT does not support a PTW; and the communication apparatus is further caused to:

in response to the first RAT belonging to the first-type RAT, send a first eDRX parameter to the first access network device, wherein the first eDRX parameter comprises a PTW parameter; and in response to the first RAT belonging to the second-type RAT, sending a second eDRX parameter to the first access network device, wherein the second eDRX parameter does not comprise the PTW parameter.

16. The non-transitory computer readable medium according to claim 15, wherein the communication apparatus is further caused to:

receive the capability information of the first terminal device; and in response to the eDRX cycle of the first terminal device being greater than or equal to the first threshold, send the first eDRX parameter to the first terminal device based on the capability information of the first terminal device.

17. The non-transitory computer readable medium according to claim 16, wherein the communication apparatus is further caused to:

receive the capability information of the first terminal device from the first terminal device.

18. The non-transitory computer readable medium according to claim 16, wherein the communication apparatus is further caused to:

receive the capability information of the first terminal device from a second access network device, wherein the second access network device is accessed by the first terminal device in response to the capability information of the first terminal device being received.

19. The non-transitory computer readable medium according to claim 14, wherein the communication apparatus is further caused to:

cause the SMF network element to send the indication information.

20. The non-transitory computer readable medium according to claim 14, wherein the capability information of the first terminal device comprises type information of a radio access technology (RAT) for accessing an access network device, the capability information of the first access network device comprises information about a first RAT used by a terminal device to access the first access network device, the type information comprises one or more of information about a first-type RAT or information about a second-type RAT, an eDRX corresponding to the first-type RAT supports a paging time window (PTW), and an eDRX corresponding to the second-type RAT does not support a PTW; and the communication apparatus is further caused to:

in response to the first RAT belonging to the first-type RAT, send a first eDRX parameter to the first access network device, wherein the first eDRX parameter comprises a PTW parameter; and in response to the first RAT belonging to the second-type RAT, sending a second eDRX parameter to the first access network device.

* * * * *